(12) United States Patent
Kuno et al.

(10) Patent No.: US 7,963,656 B2
(45) Date of Patent: Jun. 21, 2011

(54) VEHICULAR METER UNIT AND DISPLAY DEVICE

(75) Inventors: Masahiro Kuno, Kariya (JP); Nagako Matsuno, Nagoya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 12/926,992

(22) Filed: Dec. 22, 2010

(65) Prior Publication Data

US 2011/0090074 A1  Apr. 21, 2011

Related U.S. Application Data

(62) Division of application No. 12/078,665, filed on Apr. 2, 2008.

(30) Foreign Application Priority Data

Apr. 3, 2007 (JP) .................................. 2007-097795
Sep. 24, 2007 (JP) .................................. 2007-246369
Jan. 31, 2008 (JP) .................................. 2008-021562

(51) Int. Cl.
*B60Q 1/00* (2006.01)

(52) U.S. Cl. ............ 353/14; 353/12; 340/441; 340/459; 340/461; 340/462; 345/1.1; 345/646; 345/662

(58) Field of Classification Search .............. 353/11–14; 340/995.1, 441, 438, 459, 461, 462
See application file for complete search history.

(56) References Cited

U.S. PATENT DOCUMENTS

| 5,764,139 | A | 6/1998 | Nojima et al. |
| 7,236,089 | B2 | 6/2007 | Ono et al. |
| 7,880,602 | B2 * | 2/2011 | Kasamatsu ............ 340/461 |
| 2004/0189546 | A1 * | 9/2004 | Sumiyoshi ............ 345/8 |
| 2005/0049782 | A1 * | 3/2005 | Nakano ............ 701/208 |
| 2005/0168330 | A1 | 8/2005 | Ono et al. |
| 2007/0171142 | A1 | 7/2007 | Ikarashi et al. |
| 2008/0150709 | A1 | 6/2008 | Yamamoto et al. |
| 2008/0161997 | A1 | 7/2008 | Wengelnik et al. |

(Continued)

FOREIGN PATENT DOCUMENTS

JP  8-175227  7/1996

(Continued)

OTHER PUBLICATIONS

Japanese Office Action dated Mar. 16, 2010, issued in corresponding Japanese Application No. 2008-021562, with English translation.

(Continued)

*Primary Examiner* — William C Dowling
(74) *Attorney, Agent, or Firm* — Nixon & Vanderhye PC

(57) ABSTRACT

In a first display mode, a common image function component is displayed to occupy at least a part of a display region of a second specific image function component. In a second display mode, the common image function component is continuously displayed outside the second specific image function component to avoid the overlap therebetween (i.e., such that an exclusive positional relationship is made therebetween). When the display mode is switched, a final transition of the display mode to a display state in the second display mode is made while or after a moving image showing a transition process, in which the common image function component is moved from a display position in the first display mode to a display position in the second display mode, is displayed as a mode transition animation.

4 Claims, 18 Drawing Sheets

U.S. PATENT DOCUMENTS

| | | |
|---|---|---|
| 2008/0197990 A1 | 8/2008 | Yamamoto et al. |
| 2008/0204205 A1 | 8/2008 | Yamamoto et al. |
| 2008/0309475 A1 | 12/2008 | Kuno |

FOREIGN PATENT DOCUMENTS

| | | |
|---|---|---|
| JP | 2000-043652 | 2/2000 |
| JP | 2001-277905 | 10/2001 |
| JP | 3477995 | 10/2003 |
| JP | 2004-136823 | 5/2004 |
| JP | 2004-182092 | 7/2004 |
| JP | 3777790 | 3/2006 |
| JP | 2006-103364 | 4/2006 |
| JP | 2006-268649 | 10/2006 |
| JP | 2007-064761 | 3/2007 |
| JP | 2007-153116 | 6/2007 |

OTHER PUBLICATIONS

Japanese Office Action dated Nov. 25, 2009, issued in corresponding Japanese Application No. 2008-021562, with English translation.

Japanese Office Action dated Jul. 28, 2009, issued in corresponding Japanese Application No. 2007-246369, with English translation.

Japanese Office Action dated Feb. 17, 2009, issued in corresponding Japanese Application No. 2007-097795, with English translation.

* cited by examiner

46 → 46

FIRST DISPLAY MODE    SECOND DISPLAY MODE

46 → 46

VEHICULAR METER UNIT AND DISPLAY DEVICE

CROSS REFERENCE TO RELATED APPLICATION

This application is a Division of application Ser. No. 12/078,665, filed Apr. 2, 2008, which claims priority from and is based on Japanese Patent Applications No. 2007-97795 filed on Apr. 3, 2007, No. 2007-246369 filed on Sep. 24, 2007, and No. 2008-21562 filed on Jan. 31, 2008, the contents of each of which are incorporated herein by reference in their entirety.

BACKGROUND OF THE INVENTION

1. Field of the Invention

The present invention relates to a vehicular meter unit. The present invention also relates to a display device that switches a display of a display panel, in which multiple pixels are formed in a matrix shape, between a display image and a contraction image indicating the same information.

2. Description of Related Art

A meter is installed in a cockpit for a vehicle (particularly for an automobile) for displaying vehicle speed, engine rotation speed and the like. A classical analog mechanical pointer type meter is known as such the meter. Also, a meter unit that is constructed of a display such as a liquid crystal panel and that displays a color image of the meter (so-called software meter) therein instead of the conventional analog mechanical meter, e.g., as described in Patent document 1 (JP-A-2004-182092), is widely used. Such the meter unit has an advantage of capability of easily displaying a synthesized image window such as a night vision (i.e., a night view image) provided by an infrared camera, a camera image such as a back monitor image or a map image of a car navigation system on a display screen together with the software meter.

In the case where a vehicle speed meter or a tachometer is constructed of a pointer type meter, the vehicle speed or the engine rotation speed can be directly read from a pointer position. Thus, the pointer type meter provides an advantage of intuitive recognition of the current meter indication value. However, the pointer type meter has a disadvantage that reading accuracy of the indication value is inferior to that of a digital meter directly displaying the indication value in figures. Patent document 1 describes a scheme of combining the pointer type meter and the digital meter to compensate the disadvantages with each other.

In the case where the image window such as the camera image or the map image is displayed on the display for displaying the meter, the meter is required to be displayed in a margin of the image window, so the display of the meter tends to be restricted. Therefore, Patent document 1 describes a scheme of switching the display mode between a first display mode and a second display mode. The first display mode prioritizes the meter display by omitting the display of the image window. The second display mode displays the meter image in the margin of the image window in the restricted manner by omitting or contracting the display of some meters.

FIG. 5 of Patent document 1 shows a construction of a display form in the first display mode of arranging a circular pointer type analog speed meter and a tachometer of the same type side by side (in a horizontal direction) and of locating a digital speed meter displaying the speed in figures in a central position between the speed meter and the tachometer. FIG. 6 of Patent document 1 shows a construction of a display form in the second display mode of locating an image window of a car navigation system in the center of the screen and of locating the pointer type analog speed meter and the tachometer respectively in margins on both sides of the image window. However, this construction causes following defects (1) to (3) when the display mode is switched from the first display mode to the second display mode, for example.

(1) The digital speed meter displayed in the center of the screen in the first display mode is vanished by the image window (subsidiary information output section) as soon as the display mode is switched from the first display mode to the second display mode. Therefore, there is a possibility that a driver driving the vehicle while watching the digital speed meter loses the sight of the digital speed meter and feels confused.

(2) The pointer type analog speed meter and the tachometer are displayed in sufficient spaces extending to the vicinity of the center of the screen in the first display mode. However, in the second display mode, the pointer type analog speed meter and the tachometer are displayed in compressed and deformed elliptic shapes in the margins on the both sides of the image window (subsidiary information output section) as positions largely moved from those of the first display mode. Since the form and the position of the pointer type analog speed meter change at the same time when the display mode is switched to the second display mode, there is a possibility that the driver driving the vehicle while watching the pointer type analog speed meter needs some time to recognize that the pointer type analog speed meter in the second display mode is functionally equivalent to the pointer type analog speed meter in the first display mode and feels confused.

(3) For solving the above problem (1), FIG. 26 of Patent document 1 shows a construction of continuously displaying the digital speed meter also in the second display mode in a different position on the screen (specifically, in a lower position in the left end of the screen). However, also in this case, the digital speed meter still disappears from the center of the screen in the second display mode. Therefore, there is a possibility that the driver needs some time to recognize that the display of the digital speed meter is continued in the position moved to the left end of the screen. Moreover, in the case where the digital speed meter is displayed over the deformed pointer type analog speed meter, there is a disadvantage of difficulty in reading the digital speed meter.

Patent document 2 (JP-A-H9-123848) describes a display device that switches a display of a display panel such as a liquid crystal panel, in which multiple pixels are formed in a matrix shape, between a display image and a contraction image indicating the same information. Although not clearly mentioned in Patent document 2, it is required to display a contraction image contracted in a form different from that of the display image when the display image indicating certain information is displayed in a contracted manner. It is because recognition becomes difficult if the display image is contracted in homogenous deformation and displayed without altering the form. Accordingly, it is required to contract the display image by altering the form to enable the recognition.

Therefore, when the display is switched from the display image to the contraction image, an image change as an addition of the change due to the contraction and the change due to the alteration of the form gives an odd feeling to a viewer as a rapid change of the image. This problem occurs also when the display is switched from the contraction image to the display image.

SUMMARY OF THE INVENTION

It is an object of the present invention to reduce confusion in reading of a meter display at the time when a display mode is switched.

It is another object of the present invention to provide a vehicular meter unit that enables a driver to easily recognize a correlation between display layouts of a meter in display modes of the meter before and after switching of the display mode and that largely alleviates a confused feeling of the driver due to the mode switching at the time when the driver reads the meter even if the switching of the display mode causes a large change in the display layout of the meter.

It is yet another object of the present invention to alleviate a change of an image due to switching of a display of a display panel, in which multiple pixels are formed in a matrix shape, performed by a display device switching the display between a display image and a contraction image indicating the same information.

According to an aspect of the present invention, a vehicular meter unit arranged to face a driver's seat of a vehicle has a meter display device and a display control device. The meter display device displays a plurality of image function components, each of which is formed as either one of an image meter indicating an obtained meter indication value and an information output section other than the image meter for changing a display state in accordance with an obtained information content, on a screen of a display. The image function components include at least one image meter. The display of the image function components can be switched between a first display mode and a second display mode providing different display layouts of the image function components. The display control device sets a display region of a second specific image function component in the second display mode such that the display region of the second specific image function component overlaps at least partially with a display region of a common image function component in the first display mode on the screen after the switching of the display mode. The second specific image function component is the image function component displayed as a display object only in the second display mode. The common image function component is the image function component displayed as a display object in both of the first display mode and the second display mode. The display control device sets a display region of the common image function component in the second display mode exclusively outside the display region of the second specific image function component. The display control device sets a display state in the second display mode in the case where the display mode is switched from the first display mode to the second display mode while or after a moving image showing a transition process of movement of the common image function component from a display position in the first display mode to a display position in the second display mode is displayed as a mode transition animation.

In the above configuration, the second specific image function component is newly displayed when the display mode is switched to the second display mode. At this time, the common image function component having been displayed to occupy at least a part of the display region of the second specific image function component in the first display mode is continuously displayed outside the second specific image function component in the second display mode such that the common image function component does not overlap with the second specific image function component (i.e., such that an exclusive positional relationship is made therebetween). When the display mode is switched, the final transition to the display state in the second display mode is made while or after the moving image showing the transition process, in which the common image function component moves from the display position of the first display mode to the display position of the second display mode, is displayed as the mode transition animation. As a result, a driver's sight line can be guided to a transfer destination of the common image function component in the second display mode through the mode transition animation. Therefore, although the common image function component disappears from the previous position in the first display mode, the degree of the confusion the driver feels can be largely reduced. Particularly if the moving image of continuously moving the common image function component along a route from the display position in the first display mode to the display position in the second display mode is displayed as the mode transition animation, the effect of guiding the driver's sight line can be further enhanced.

The above effect is particularly effective in the case where the common image function component is an image meter that is frequently visually recognized for reading an indication value. In particular, in the case where an area of the display region of the image meter is set smaller than an area of the display region of the second specific image function component, a defect of losing sight of the small image meter due to the transfer can be restricted remarkably and effectively.

In the case where the second specific image function component having a large occupation rate in the vertical direction of the screen of the display is displayed in the second display mode, it is preferable that the image meter constituting the common image function component is displayed adjacent to a right or a left side of the second specific image function component. In this case, in the first display mode, the image meter (the common image function component) is displayed in a position overlapping with a (scheduled) display region of the second specific image function component. In the second display mode, the image meter moves relatively largely in the right direction or the left direction such that the display position is changed to a position adjacent to the second specific image function component. According to the aspect of the present invention, regardless of the large movement of the image meter in the lateral direction due to the mode switching, the driver's sight line can be securely guided to the movement destination by the mode transition animation. An example of the second specific image function component having the large occupation rate in the vertical direction of the screen is a camera image display section (e.g., a display screen of a night vision or a back view) or a car navigation screen display section.

The display control device may display the image meter constituting the common image function component in the same form in the first display mode and the second display mode. Thus, the common image function component changes only the position thereof without changing the display form thereof when the mode is switched. Therefore, the guidance of the driver's sight line by the mode transition animation can be performed more securely. The mode transition animation for moving the common image function component can be produced by only changing a position for putting the image of the common image function component having the same form on a frame over moving image frames of the animation. Accordingly, the work for producing the moving images of the animation can be largely simplified. An example of the image meter constituting the common image function component having such the form is a digital speed meter. The digital speed meter displays a current speed value with digits of a certain font. The moving image frames of the animation can be easily produced by only sequentially changing a putting position of the digit font image indicating the speed indication value on the frames along the movement direction.

The display control device may set a display region of a first specific image function component such that the display region of the first specific image function component overlaps at least partially with the display region of the second specific image function component on the screen after the switching of the display mode. The first specific image function component is the image function component displayed as a display object only in the first display mode. In this case, the display control device may provide a display state in the second display mode in the case where the display mode is switched from the first display mode to the second display mode while or after a moving image, in which a display state of the first specific image function component is gradually erased, is displayed as the mode transition animation.

According to another aspect of the present invention, the vehicular meter unit has a meter display device and a display control device. The meter display device displays a plurality of image function components, each of which is formed as either one of an image meter displaying an obtained meter indication value and an information output section other than the image meter for changing a display state in accordance with an obtained information content, on a screen of a display. The image function components include at least one image meter. The display of the image function components can be switched between a first display mode and a second display mode providing different display layouts of the image function components. The display control device sets a display region of a first specific image function component such that the display region of the first specific image overlaps at least partially with a display region of a second specific image function component on the screen after the switching of the display mode. The first specific image function component is the image function component displayed as a display object only in the first display mode. The second specific image function component is the image function component displayed as a display object only in the second display mode. The display control device provides a display state in the second display mode in the case where the display mode is switched from the first display mode to the second display mode while or after a moving image, in which a display state of the first specific image function component is gradually erased, is displayed as a mode transition animation.

The first specific image function component is displayed only in the first display mode and occupies a region, where the second specific image function component is supposed to be displayed in the second display mode, as a "preceding visitor." Accordingly, if the first display mode is suddenly switched to the second display mode, the first specific image function component suddenly disappears and instead, the second specific image function component appears to emerge suddenly in the region having been occupied by the first specific image function component. Therefore, a feeling of disconnection of the image or a sense of loss for the first specific image function component having been displayed is very large. As a result, a driver cannot quickly recognize that the first specific image function component has disappeared immediately after the display mode is switched to the second display mode. The driver is confused and unconsciously looks for the first specific image function component.

As contrasted thereto, with the above construction, the moving image for gradually erasing the display state of the first specific image function component is displayed as the mode transition animation when the display mode is switched from the first display mode to the second display mode. Therefore, the state of the disappearance of the first specific image function component can be strongly impressed to the driver psychologically through the animation. As a result, the driver can quickly recognize nonexistence of the first specific image function component in the second display mode, easing the confusion of the driver.

The display control device may display the moving image, in which the first specific image function component is gradually contracted toward a convergence point beforehand defined within the display region of the second specific image function component in the second display mode and erased, as the mode transition animation. Since the first specific image function component is contracted from an original display size and is erased, the feeling of the disconnection of the image due to the switching of the display mode can be effectively eased. Further, the display control device may display the moving image, in which the first specific image function component is faded out and erased, as the mode transition animation. Also in this case, the feeling of the disconnection of the image can be effectively eased. Combination of both is also effective. Likewise, the moving image for erasing the first specific image function component in a swept manner from one end side to the other end side along a predetermined erasing direction on the screen may be displayed as the mode transition animation.

For example, the first specific image function component preferable as an application object is an image meter that has a relatively large area making it difficult to display the image meter simultaneously with the second specific image function component having a large area in the second display mode and that has low frequency of visual recognition by the driver. Alternatively, for example, the first specific image function component preferable as the application object is an image meter that can be replaced by another image meter having the same kind of an indication object parameter in the second display mode. For example, in the case of an example of a meter display of vehicle speed, the first specific image function component may be a rotational pointer type analog speed meter having a scale plate with a large display area. In this case, a digital speed meter having a small meter occupation area may be displayed in the second display mode. The digital speed meter can be employed as the common image function component displayed in both of the first and second display modes. In consequence, in the first display mode, the driver can securely and quickly recognize the current vehicle speed visually through both of the rotational pointer type analog speed meter (the first specific image function component) and the digital speed meter. In the second display mode, even if the second specific image function component (for example, the image display window consisting of the aforementioned camera image display section or the car navigation screen display section) is newly displayed, the vehicle speed can be continuously read through the digital speed meter. When the display mode is switched to the second display mode, the layout of the meters is largely changed such that the rotational pointer type analog speed meter (the first specific image function component) is erased and the digital speed meter moves to the outside of the second specific image function component. However, the driver can easily recognize the correlation with the layout in the first display mode by the above mode transition animation (for example, the driver can recognize which meter moves and which meter is erased). As a result, the confusion in the reading of the meter due to the switching of the mode can be largely reduced.

In the first display mode, a rotational pointer type analog output meter indicating an output state of a vehicle drive section may be provided as the first specific image function component different from the rotational pointer type analog speed meter such that the rotational pointer type analog output meter is displayed adjacently to and together with the rotational pointer type analog speed meter side by side on the screen. The second specific image function component may be an image display window that is formed to overlap with and bridge both of the rotational pointer type analog output meter and the rotational pointer type analog speed meter arranged side by side and that constitutes the camera image display section or the car navigation screen display section. The display control device may display a moving image for gradually contracting and erasing the rotational pointer type analog output meter and the rotational pointer type analog speed meter arranged side by side toward a convergence point defined at an intermediate position between the rotational pointer type analog output meter and the rotational pointer type analog speed meter with respect to the lateral direction and for moving the digital speed meter constituting the common image function component toward an outside of a side edge of the image display window opposite to the contraction direction to the convergence point of the rotational pointer type analog speed meter as the mode transition animation.

The rotational pointer type analog output meter and the rotational pointer type analog speed meter are displayed in large areas adjacent to each other side by side in the first display mode but the image display window is displayed in the position overlapping with and bridging the both of the rotational pointer type analog output meter and the rotational pointer type analog speed meter in the second display mode. Therefore, the rotational pointer type analog output meter and the rotational pointer type analog speed meter are erased in the mode transition animation such that the rotational pointer type analog output meter and the rotational pointer type analog speed meter are contracted toward the convergence point set in the intermediate position therebetween and erased in the second display mode.

The digital speed meter having occupied a scheduled display position of the image display window in the first display mode moves in the direction opposite to the direction of the contraction and the erasure of the rotational pointer type analog speed meter and is finally displayed adjacently to the image display window side by side. Thus, the movement of the contraction of the rotational pointer type analog speed meter and the movement of the digital speed meter in the lateral direction do not cross each other in the same direction and the movement of the digital speed meter continuously displayed also in the second display mode can be smoothly traced.

The display control device may hold the indication value of the image meter relating to the display of the mode transition animation and may fix an indication state of the image meter to the held indication value in the middle of displaying the mode transition animation when the display mode is switched from the first display mode to the second display mode. Thus, a complicated process of renewing in real time the meter indication value generated in the middle of output process of the moving image of the mode transition animation for every moving image frame becomes unnecessary. As long as the display time of the mode transition animation is kept within a relatively limited time relating to the display mode switching, the driver does not feel a strong uncomfortable feeling even if the indication value of the image meter is held during the time. In the case where the image meter relating to the display of the mode transition animation includes the rotational pointer type analog meter, with the above scheme, a pointer position of the rotational pointer type analog meter on the moving image is fixed to the held indication value during the display and output of the mode transition animation.

The mode transition animation may be outputted in the form, in which the pointer image is eliminated from the rotational pointer type analog meter. Thus, a complicated process of reflecting in real time the meter indication value generated during the output processing of the moving image of the mode transition animation in the pointer position for every moving image frame becomes unnecessary. Further, as long as the display time of the mode transition animation is within a relatively limited time relating to the display mode switching, a driver does not feel a strong uncomfortable feeling even if the pointer disappears from the rotational pointer type analog meter during the time.

According to another aspect of the present invention, a vehicular meter unit has a first meter display device, a second meter display device, and a display mode switching device. The first meter display device displays an image indicative of speed of a vehicle on a screen of a display as a first display mode with the use of a pointer type analog speed meter having a pointer, which can move along a prescribed indication track, and a scale plate graphic, which is formed along the indication track, and an image of a digital speed meter, which digitally indicates a speed indication value of the pointer with a digit image, in a first position specific to the first display mode together with the pointer type analog speed meter. The second meter display device displays a subsidiary information output section, which is specific to a second display mode and is not displayed in the first display mode, on the screen of the display as the second display mode such that the subsidiary information output section overlaps with and bridges both of a region occupied by the pointer type analog speed meter in the first display mode and a region occupied by the digital speed meter in the first display mode while erasing the image of the pointer type analog speed meter. The second meter display device moves the digital speed meter from the first position to a second position specific to the second display mode, which does not overlap with the subsidiary information output section, and displays the digital speed meter at the second position. The display mode switching device switches an image display state of the display between the first display mode and the second display mode.

With the configuration, when the display mode is switched to the second display mode, the image of the pointer type analog speed meter is erased and the subsidiary information output section is newly displayed on the screen. In addition, the digital speed meter displayed in the first display mode such that the digital speed meter occupies at least a part of a display region of the subsidiary information output section is continuously displayed outside the subsidiary information output section in the second display mode such that the digital speed meter does not overlap with the subsidiary information output section (i.e., such that exclusive positional relationship is made therebetween). That is, the image of the pointer type analog speed meter is erased in the second display mode and only the digital speed meter remains as the display device of the current vehicle speed in the second display mode. Accordingly, after the transition to the second display mode, the current vehicle speed can be grasped immediately with the digital speed meter without being troubled by the pointer type analog speed meter as a redundant vehicle speed indicator. Moreover, the display position of the digital speed meter is changed to the second position, which does not overlap with the subsidiary information output section. Accordingly, the optical recognition of the digital speed meter is further improved. Thus, the confusion that the driver feels can be largely reduced even though the digital speed meter disappears from the position (the first position) originally provided in the first display mode.

From the viewpoint of quick recognition of the display position of the digital speed meter after the transition to the second display mode, it is preferable that the digital image displayed by the digital speed meter for indicating the speed indication value is set at the same display size in both of the first display mode and the second display mode. In this case, it is more preferable that the digital image displayed by the digital speed meter for indicating the speed indication value is set with the same font in both of the first display mode and the second display mode.

In this case, when the display mode switching device switches the display mode from the first display mode to the second display mode, the display mode switching device may switch the digital speed meter directly from the display state at the first display position to the display state at the second display position without going through a display state at an intermediate position between the first position and the second position. With the configuration, since the switching process does not go through the display state at the intermediate position, display position alteration process regarding the digital speed meter can be simplified. In this case, the digital speed meter appears to instantly move from the first position to the second position when the display mode is switched from the first display mode to the second display mode. However, the moving destination is the outside region of the subsidiary information output section where the pointer type analog speed meter disappeared. Accordingly, even if the display position is altered instantly, the trouble of losing the sight of the digital speed meter can be suppressed.

When the meter display mode switching device switches the display mode from the first display mode to the second display mode, the meter display mode switching device may perform the switching from the display state of the digital speed meter at the first position to the display state of the digital speed meter at the second position after the completion of the erasure of the pointer type analog speed meter. With this configuration, the alteration of the display position of the digital speed meter is performed after the pointer type analog meter, which can be a cause of the confusion of the visual recognition of the digital speed meter when the meter display mode is switched, is completely erased once. As a result, the trouble of losing the sight of the digital speed meter can be further suppressed.

When the meter display mode switching device switches the display mode from the first display mode to the second display mode, the meter display mode switching device may perform display control of causing the subsidiary information output section to emerge after the completion of the switching from the display state of the digital speed meter at the first position to the display state of the digital speed meter at the second position. The subsidiary information output section can be also a cause of the confusion of the visual recognition of the digital speed meter when the meter display mode is switched. Since the above-described configuration causes the subsidiary information output section to emerge after the completion of the alteration of the display position of the digital speed meter, the trouble of losing the sight of the digital speed meter can be further suppressed.

When the meter display mode switching device switches the display mode from the first display mode to the second display mode, the meter display mode switching device may provide the display state in the second display mode after displaying a moving image of gradually erasing the display state of the pointer type analog speed meter as a mode transition animation. The pointer type analog speed meter is displayed only in the first display mode and occupies a region, where the subsidiary information output section is supposed to be displayed in the second display mode, as a "preceding visitor." Accordingly, if the first display mode is suddenly switched to the second display mode, the pointer type analog speed meter suddenly disappears and instead, the subsidiary information output section appears to emerge suddenly in the region having been occupied by the pointer type analog speed meter. Therefore, a feeling of disconnection of the image or a sense of loss for the pointer type analog speed meter having been displayed is very large. As a result, the driver cannot quickly recognize that the pointer type analog speed meter has disappeared immediately after the display mode is switched to the second display mode. The driver is confused and unconsciously looks for the pointer type analog speed meter. As contrasted thereto, with the above configuration, when the display mode is switched from the first display mode to the second display mode, the moving image of gradually erasing the display state of the pointer type analog speed meter is displayed as the mode transition animation. Accordingly, the state of the disappearance of the pointer type analog speed meter can be impressed strongly on the driver's feeling with the animation. As a result, the absence of the pointer type analog speed meter in the second display mode can be quickly impressed on the driver, reducing the confusion.

In this case, the meter display mode switching device may display a moving image, in which the pointer type analog speed meter is gradually contracted toward a convergence point defined within the display region of the subsidiary information output section in the second display mode and erased, as the mode transition animation. Since the pointer type analog speed meter is contracted from an original display size and is erased, the feeling of the disconnection of the image due to the switching of the display mode can be effectively alleviated. Further, the display control device may display a moving image, in which the pointer type analog speed meter is faded out and erased, as the mode transition animation. Also in this case, the feeling of the disconnection of the image can be effectively alleviated. Combination of both is also effective. Likewise, a moving image for erasing the pointer type analog speed meter in a swept manner from one end side to the other end side along a predetermined erasing direction on the screen may be displayed as the mode transition animation.

The subsidiary information output section may be an image display window providing a camera image display section or a car navigation image display section. Such the image display window has a relatively large area, enlarging the distance for altering the display position of the digital speed meter accompanying the switching of the display mode. However, since the analog speed meter disappears, the trouble of losing the sight of the digital speed meter can be effectively reduced. In this case, when the meter display mode switching device switches the display mode from the first display mode to the second display mode, the meter display mode switching device may provide the display state in the second display mode after displaying a moving image of causing the image display window to gradually emerge as a mode transition animation. By causing the image display window having the large area to gradually emerge through the mode transition animation, an odd feeling due to the sudden emergence of the image display window accompanying the switching of the display mode can be reduced.

According to another aspect of the present invention, a display device has a display panel in which a plurality of pixels are formed in a matrix shape and a control device for switching a display of the display panel among a first display image indicating first information, a contraction image indicating the first information in a form that is contracted from the first display image and that is different from the first display image and an intermediate image indicating the first information in the same size as the first display image and in a form that is the same as or similar to the contraction image.

When the display is switched between the first display image and the contraction image, the display is switched to the intermediate image in the course of the switching of the display.

With the configuration, when the display is switched between the first display image and the contraction image that is contracted from the first display image and that has the form different from the first display image, the display is switched to the intermediate image having the same size as the first display image and the form that is the same as or similar to the contraction image in the course of the switching of the display. In consequence, the changes in both of the form and the size of the image due to the switching of the display between the first display image and the contraction image can be separated into a change of the form of the image due to the switching of the display between the first display image and the intermediate image and a change of the size of the image due to the switching of the display between the contraction image and the intermediate image. Therefore, a change of the image due to the switching of the display between the first display image and the contraction image can be moderated.

According to another aspect of the present invention, the display device switches the display from the intermediate image to the contraction image by gradually contracting the intermediate image to a size of the contraction image. In consequence, a change in the size of the image due to the switching of the display from the intermediate image to the contraction image can be moderated. Accordingly, the change of the image due to the switching of the display from the first image to the contraction image can be further moderated.

According to another aspect of the present invention, the display device switches the display from the contraction image to the intermediate image by gradually enlarging the contraction image to the size of the intermediate image. In consequence, a change in the size of the image due to the switching of the display from the contraction image to the intermediate image can be moderated. Accordingly, the change of the image due to the switching of the display from the contraction image to the first display image can be further moderated.

According to yet another aspect of the present invention, when the display is switched to the contraction image, the display device displays a second display image indicating second information by using a region obtained by subtracting a region where the contraction image is indicated from a region where the first display image was indicated. In consequence, in addition to the aforementioned effects, the region produced by switching the display to the contraction image can be effectively used and therefore, many pieces of information can be displayed in a limited space.

BRIEF DESCRIPTION OF THE DRAWINGS

Features and advantages of embodiments will be appreciated, as well as methods of operation and the function of the related parts, from a study of the following detailed description, the appended claims, and the drawings, all, of which form a part of this application. In the drawings:

DETAILED DESCRIPTION OF EXAMPLE EMBODIMENTS

Figure 1:
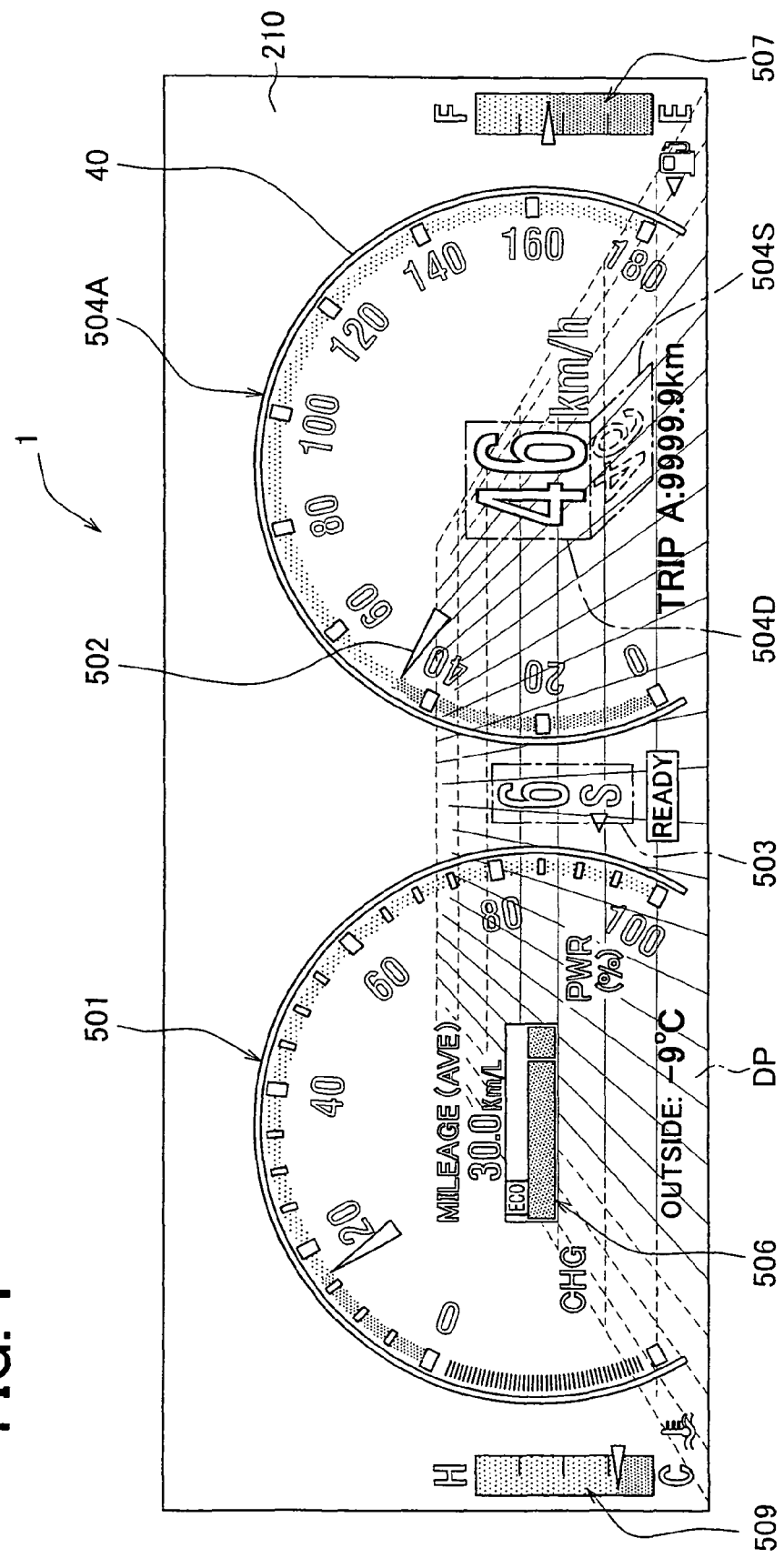
FIG. 1 is a front view showing a screen display example of a vehicular meter unit in a first display mode according to a first embodiment of the present invention.
Figure 3:
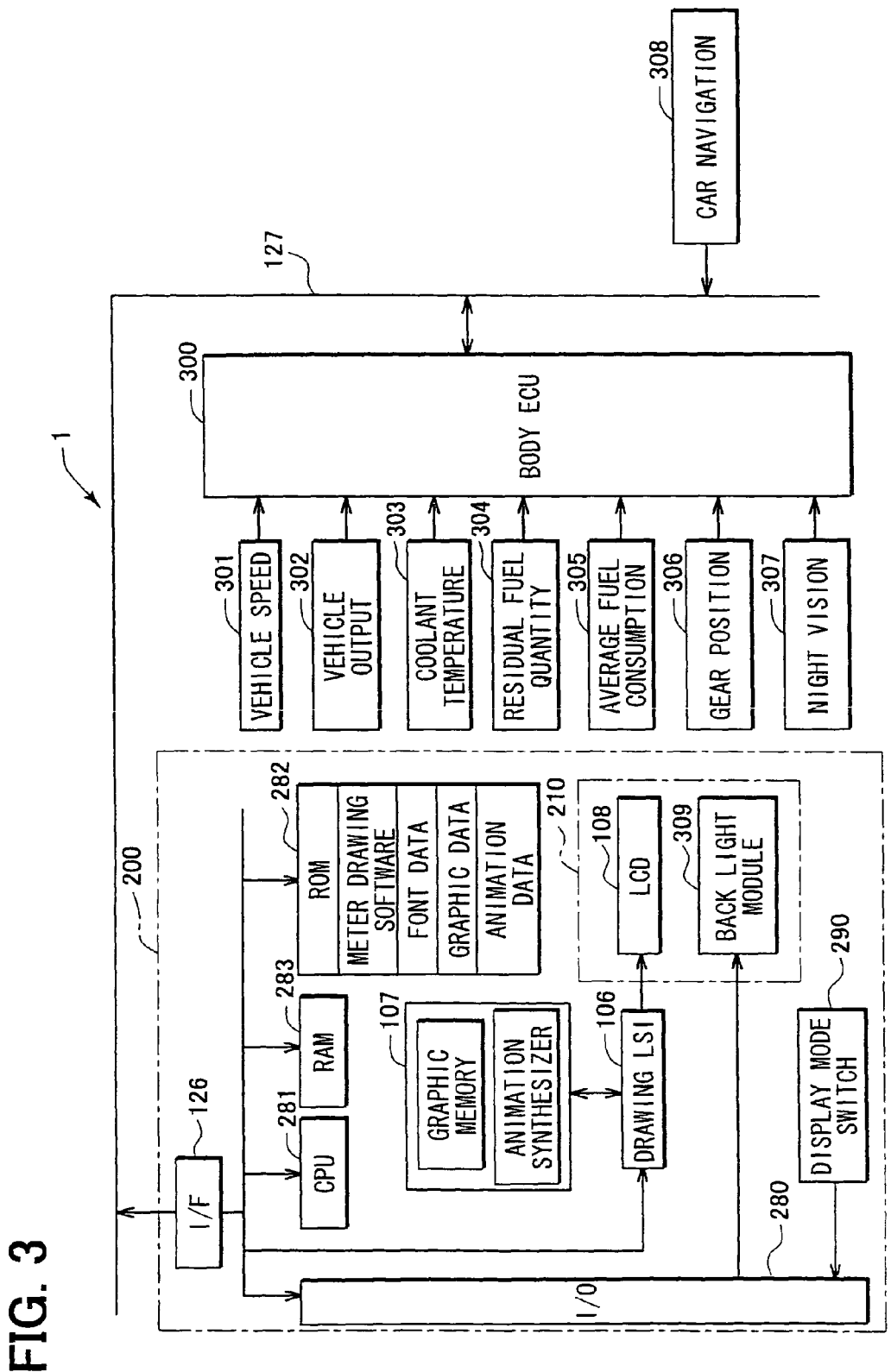
FIG. 3 is a block diagram showing an electrical construction of the vehicular meter unit according to the first embodiment.

Hereinafter, embodiments of the present invention will be explained with reference to the drawings. FIG. 1 is a diagram showing a screen display example of a vehicular meter unit in a first display mode according to the present embodiment. The vehicular meter unit 1 is located to face a driver's seat of an automobile (a vehicle) and displays multiple meter images together on a display 210 in a form in which the meter images are congregated in a predetermined layout. The display 210 has a color liquid crystal panel 108 (LCD: Liquid Crystal Display) and a back light module 309 as shown in FIG. 3. As examples of the meter images, a gear position meter 503, speed meters 504A, 504D, a rotational pointer type analog output meter 501 showing a total output and a regeneration state of a hybrid vehicle, an average fuel consumption meter 506, a residual fuel quantity meter 507 (fuel meter) and a coolant temperature meter 509 are displayed.

The speed meters 504A, 504D include a rotational pointer type analog speed meter 504A and a digital speed meter 504D. The rotational pointer type analog speed meter 504A has a pointer 502 that can move along a circular-arc-shaped indication track and a scale plate graphic 40 formed along the indication track. The digital speed meter 504D digitally displays an indication value of the pointer 502 in figures in a region containing a rotational center O of the pointer 502 inside the indication track on a screen SCR. A digit 50 is displayed in the digital speed meter 504D, and a decorative inverted shadow image 50M provided in an area 504S by vertically inverting the digit 50 is displayed under the digit 50 (also refer to FIG. 13).

FIG. 3 is a block diagram showing an example of an electrical configuration of the vehicular meter unit 1. A substantial part of the configuration is a meter ECU 200 that performs major control of the meter display. A substantial part of the meter ECU 200 is formed of a microcomputer, in which CPU 281, ROM 282, RAM 283, drawing LSI 106 and an input/output section 280 are connected through an internal bus. The ROM 282 stores meter drawing software, graphic data necessary for drawing the respective meters 503, 504A, 504D, 501, 506, 507, 509, and font data of the digit (the digit 50) for displaying the speed in the digital speed meter 504D. The display image data of the decorative inverted shadow image 50M is produced by using the font data.

Network connection is made between the meter ECU 200 and another ECU such as a body system ECU 300 through an interface 126 and a serial communication bus 127. Thus, the meter ECU 200 serves also as an operation state parameter obtaining device. The body system ECU 300 is connected with a sensor group for obtaining basic operation state information to be displayed with the meter. For example, the sensor group includes a vehicle speed sensor 301, a vehicle output sensing unit 302, a coolant temperature sensor 303 of a coolant, a residual fuel quantity sensor 304, an average fuel consumption calculation section 305, a gear position sensing section 306 and the like.

The meter ECU 200 obtains sensing information from the sensor group 301-306 through the communication bus 127 and reflects indication values of the sensing information in master images of the corresponding meters (stored in the ROM 282, for example). Thus, the meter ECU 200 produces the drawing data of the respective meters (hereinafter, referred to as meter drawing data). A sensing value of the gear position sensing section 306 shown in FIG. 3 is reflected in the gear position meter 503. A sensing value of the vehicle speed sensor 301 is reflected in the speed meters 504A, 504D. A sensing value of the vehicle output sensing unit 302 is reflected in the rotational pointer type analog output meter 501. A fuel consumption calculation value of the average fuel consumption calculation section 305 is reflected in the average fuel consumption meter 506. A sensing value of the residual fuel quantity sensor 304 is reflected in the residual fuel quantity meter 507. A sensing value of the coolant temperature sensor 303 is reflected in the coolant temperature meter 509. The drawing LSI 106 receives the drawing data and synthesizes the images on a graphic memory 107. Then, the drawing LSI 106 outputs the synthesized images to the liquid crystal panel 108 (and thus, the drawing LSI 106 realizes functions of a display control means, a first meter display means, a second meter display means, and a display mode switching means of claims in cooperation with the meter ECU 200 that executes meter drawing software).

Figure 13:
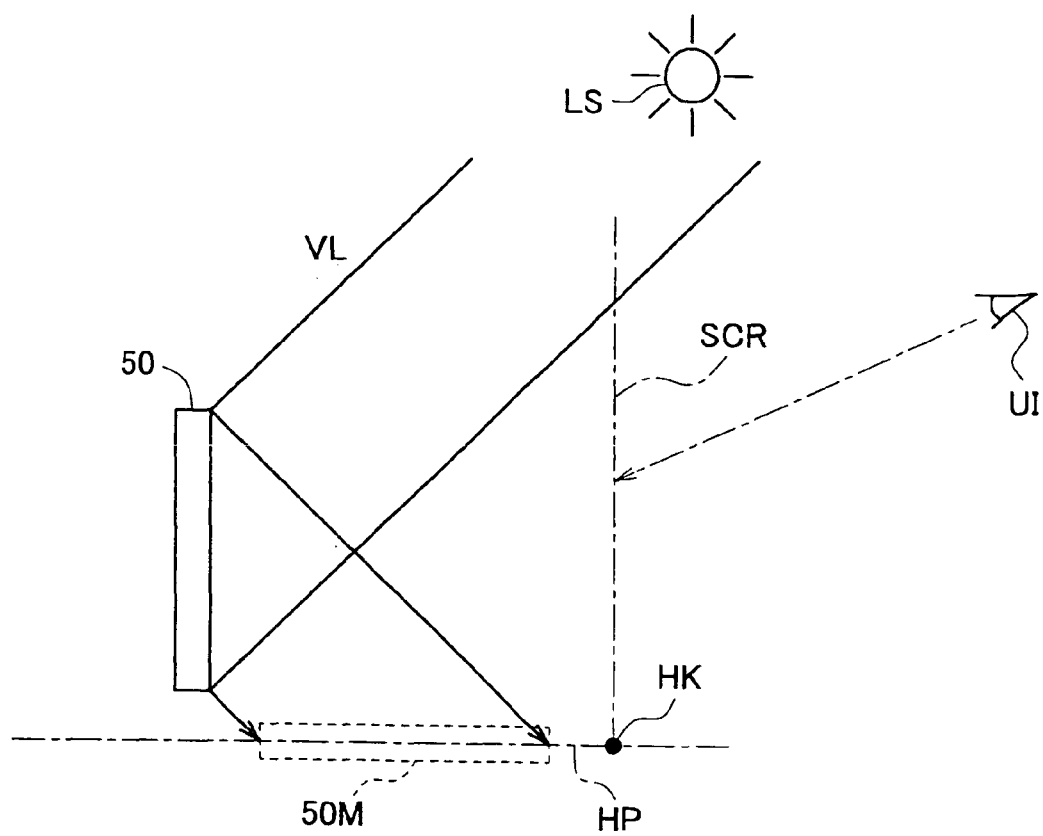
FIG. 13 is a conceptual diagram showing a decorative inverted shadow image according to the first embodiment.

Next, a characteristic part of the first display mode in light of the design will be explained. As shown in FIG. 13, concerning a horizontal reference line HK extending along a lower edge of a display region of the digit 50 on the screen of the display 210 shown in FIG. 1, a virtual projection plane HP including the horizontal reference line HK is set in the depth direction of the screen SCR. Further, it is assumed that a virtual illumination light VL is projected to the digit 50 from an upper side in front of the screen SCR where a user's viewpoint UI exists. In such the condition, the decorative inverted shadow image 50M is displayed in a three-dimensional manner in the form of imitating the projection image of the digit 50 reflected on the virtual projection plane HP by the virtual illumination light VL (also refer to FIG. 1). The decorative inverted shadow image 50M having such the form is made such that, when the digit 50 is regarded as an object in an erecting shape in the screen SCR, the reflected projection image made by the illumination light from the upper side in front of the screen SCR is expressed as if a water surface (or a mirror surface) exists under the object. Thus, an image of a refreshing and wide space can be produced on the limited display screen SCR of the meter.

As shown in FIG. 1, the decorative inverted shadow image 50M imitating the reflected projection image is displayed in a lower portion in front of the digit 50 on the virtual projection plane HP as a gradation image, whose brightness gradually reduces as distance from the lower edge of the digit 50 increases. In consequence, the brightness of the decorative inverted shadow image 50M is further reduced in the shallow side of the screen SCR (i.e., a side closer to the user) where the projection reflected light amount is reduced, enhancing reality as the reflected projection image. In addition, a decorative plane image DP extending along the virtual projection plane HP is displayed behind the meter image on the screen SCR in the form of producing a focus point in the depth direction of the screen SCR in perspective. By positively displaying such the decorative plane image DP, the existence of the virtual projection plane HP to the position corresponding to the decorative plane image DP can be actualized more. Thus, the user can intuitively recognize the decorative inverted shadow image 50M as the reflected projection image. The decorative plane image DP is displayed as the gradation image, whose brightness gradually reduces as a distance from the meter image increases backward on the virtual projection plane HP or a distance from the center of the screen SCR increases in the right-hand direction or the left-hand direction of the horizontal direction. Thus, the perspective in the case of assuming the existence of the light source LS of the virtual illumination light VL in the upper side in front of the screen SCR can be produced more realistically. In FIG. 1, a multiplicity of decorative stripes converging in the remote focus point in the depth direction of the screen are formed on the decorative plane image DP and the decorative plane image DP is designed such that the decorative plane image DP fades out in front of the focus point due to reduction of the brightness. Thus, a feeling of three-dimensional depth is enhanced.

An outline of a flow of meter operation processing concerning, for example, the speed meters 504A, 504D performed by the meter drawing software is as follows. First, when the engine starts, the sensing value of the vehicle speed obtained from the body system ECU 300 is obtained and the meter operation processing is performed in accordance with the obtained vehicle speed. The processing routine is repeatedly performed until the engine stops. For example, as shown in FIG. 1, the pointer 502 of the analog speed meter 504A is drawn such that the pointer 502 moves to a scale position corresponding to the obtained vehicle speed and the value indicating the vehicle speed is displayed in the digital speed meter 504D by using the aforementioned font data. Through the repetition of the processing routine, the drawn position of the pointer 502 and the displayed value of the digital speed meter 504D change according to a change of the obtained engine rotation speed.

Figure 2:
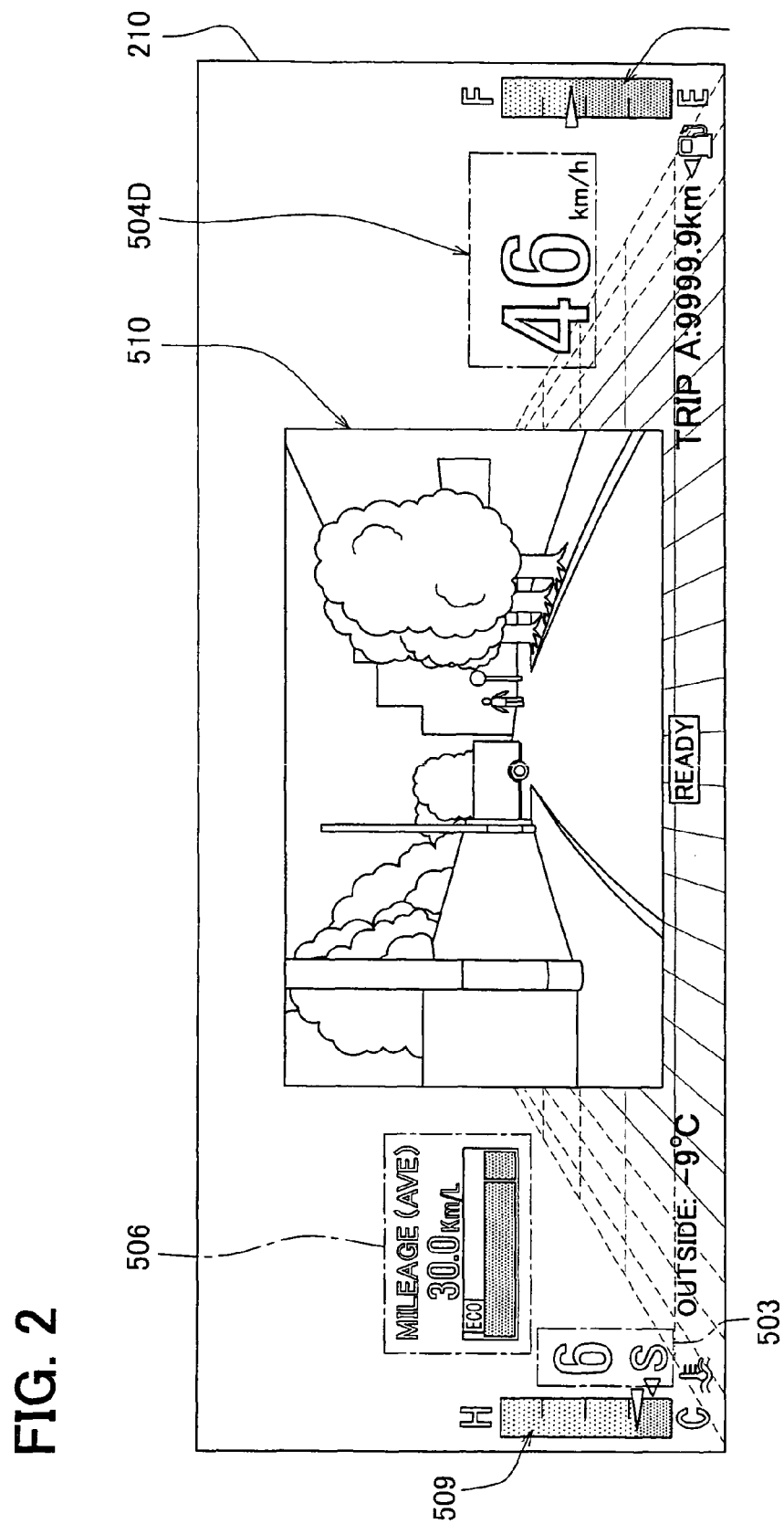
FIG. 2 is a front view showing a screen display example of the vehicular meter unit in a second display mode according to the first embodiment.

FIG. 2 shows an image display example in the second display mode with a bit map image. The image display of FIG. 2 is clearly different from the first display mode of FIG. 1 in the layout. As shown in FIG. 3, mutual switching between the first display mode and the second display mode is alternately and repeatedly performed each time a display mode switching switch 290 connected to the meter ECU 200 (or another ECU connected through the communication bus 127) is operated once. The display mode switching switch 290 is provided in a position where the driver can easily operate the display mode switching switch 290 in a vehicle compartment such as a steering wheel or a center console section.

As clearly known from the comparison between FIG. 2 and FIG. 1, the digital speed meter 504D, the average fuel consumption meter 506, the gear position meter 503, the residual fuel quantity meter 507 and the coolant temperature meter 509 are common image function components displayed in both of the first display mode and the second display mode. As contrasted thereto, the rotational pointer type analog speed meter 504A and the rotational pointer type analog output meter 501 are first specific image function components displayed only in the first display mode of FIG. 1.

Further, in the second display mode of FIG. 2, a large image display window 510 is displayed in the center of the screen SCR. The image display window 510 displays a night view image (infrared night vision image) of an outside of the vehicle taken by a known night vision camera 307 (infrared camera) connected to the body system ECU 300 shown in FIG. 3, a guide image based on a map provided by a car navigation system 308 connected through the communication bus 127 or the like. In FIG. 2, the night vision image is shown as a representative example, but the image is not limited thereto. The image display window 510 constitutes a second specific image function component displayed only in the second display mode.

When FIGS. 1 and 2 are overlapped and compared, it is clearly understood that the digital speed meter 504D, the average fuel consumption meter 506 and the gear position meter 503 out of the image meters constituting the common image function components are displayed in display positions of the first display mode shown in FIG. 1 overlapping with the display region of the second specific image function component in the second display mode, i.e., the region in which the image display window 510 is supposed to be displayed as shown in FIG. 2. Specifically, an entirety of the gear position meter 503 overlaps with the region of the image display window 510. The average fuel consumption meter 506 and the digital speed meter 504D overlap with the image display window 510 only partly. The display positions of the three image meters 504D, 506, 503 in the second display mode are set only outside the display region of the image display window 510, which is the second specific image function component. In the example of FIG. 2, the digital speed meter 504D is allotted and arranged in the right margin of the image display window 510, and the average fuel consumption meter 506 and the gear position meter 503 are allotted and arranged in the left margin.

As shown in FIG. 2, the display position and the size of the image display window 510 in the second display mode are set such that the image display window 510 overlaps with and bridges both of the rotational pointer type analog speed meter 504A and the rotational pointer type analog output meter 501 (the first specific image function components) in FIG. 1 in the center of the screen SCR of the display 210. The rotational pointer type analog speed meter 504A and the rotational pointer type analog output meter 501 are not displayed in the second display mode of FIG. 2. That is, the rotational pointer type analog speed meter 504A and the rotational pointer type analog output meter 501 are vanished when the display mode is switched to the second display mode.

Figure 8:
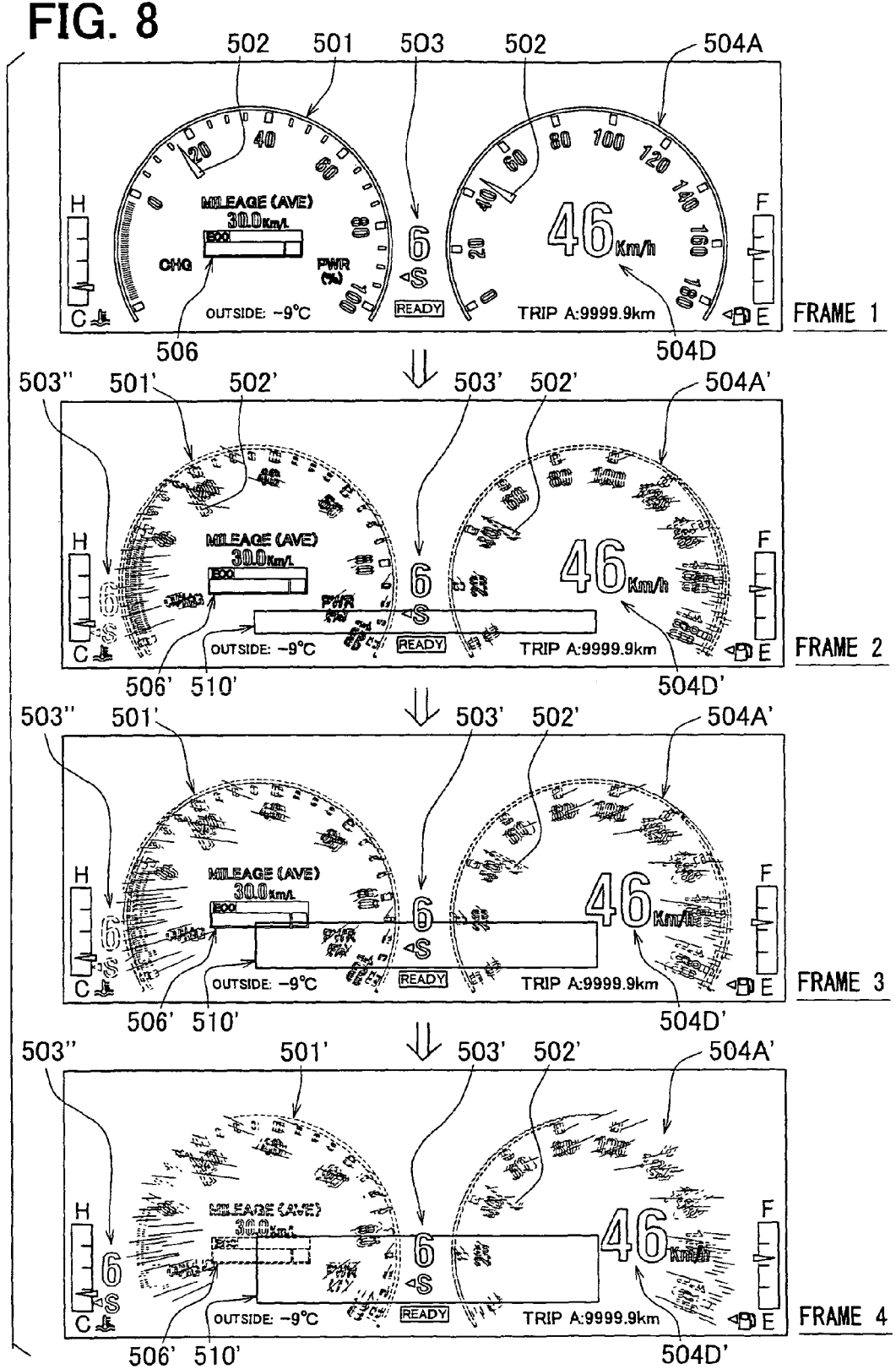
FIG. 8 is an explanatory diagram showing an actual example of the mode transition animation according to the first embodiment.
Figure 9:
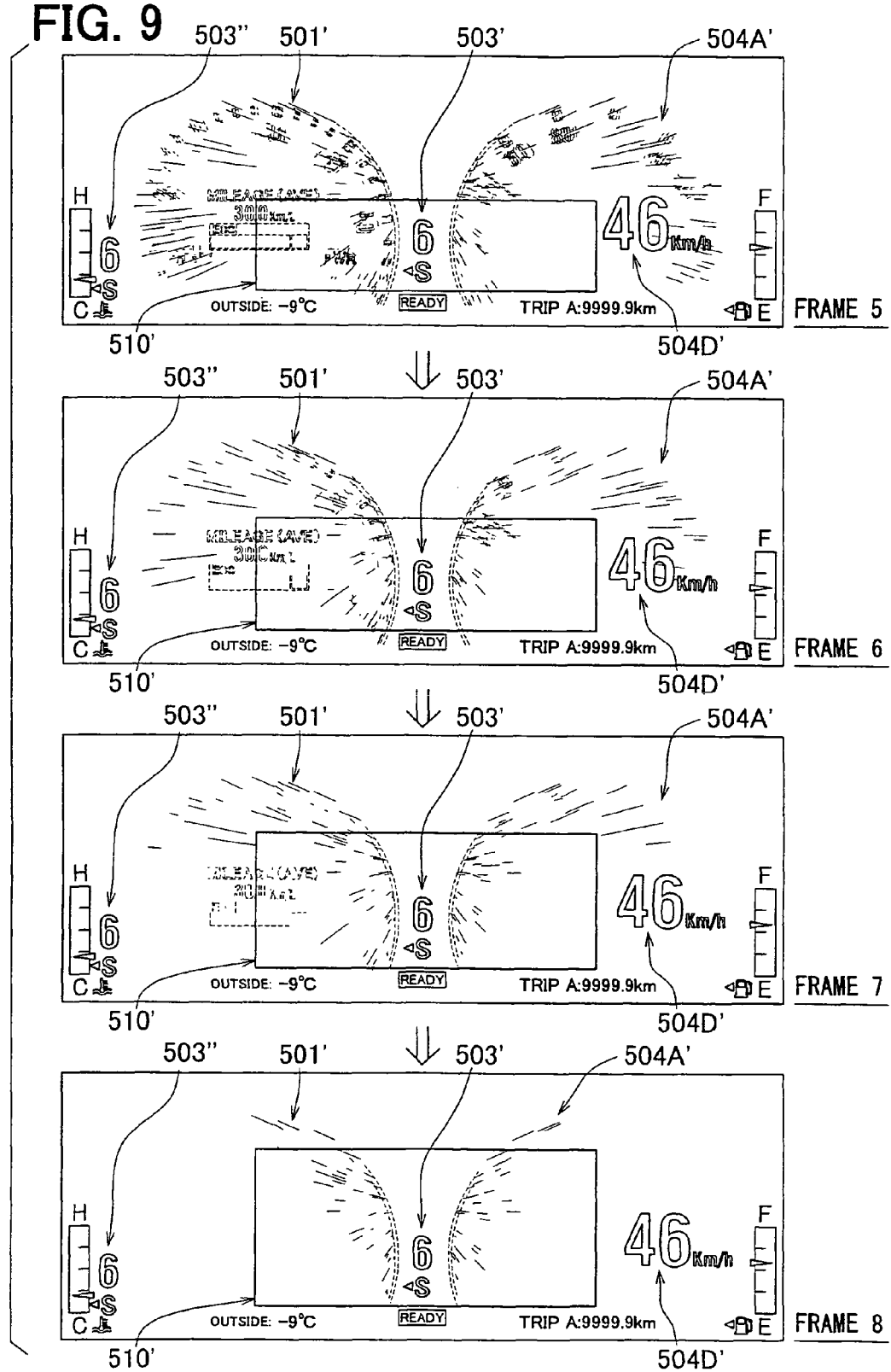
FIG. 9 is an explanatory diagram subsequent to FIG. 8.
Figure 10:
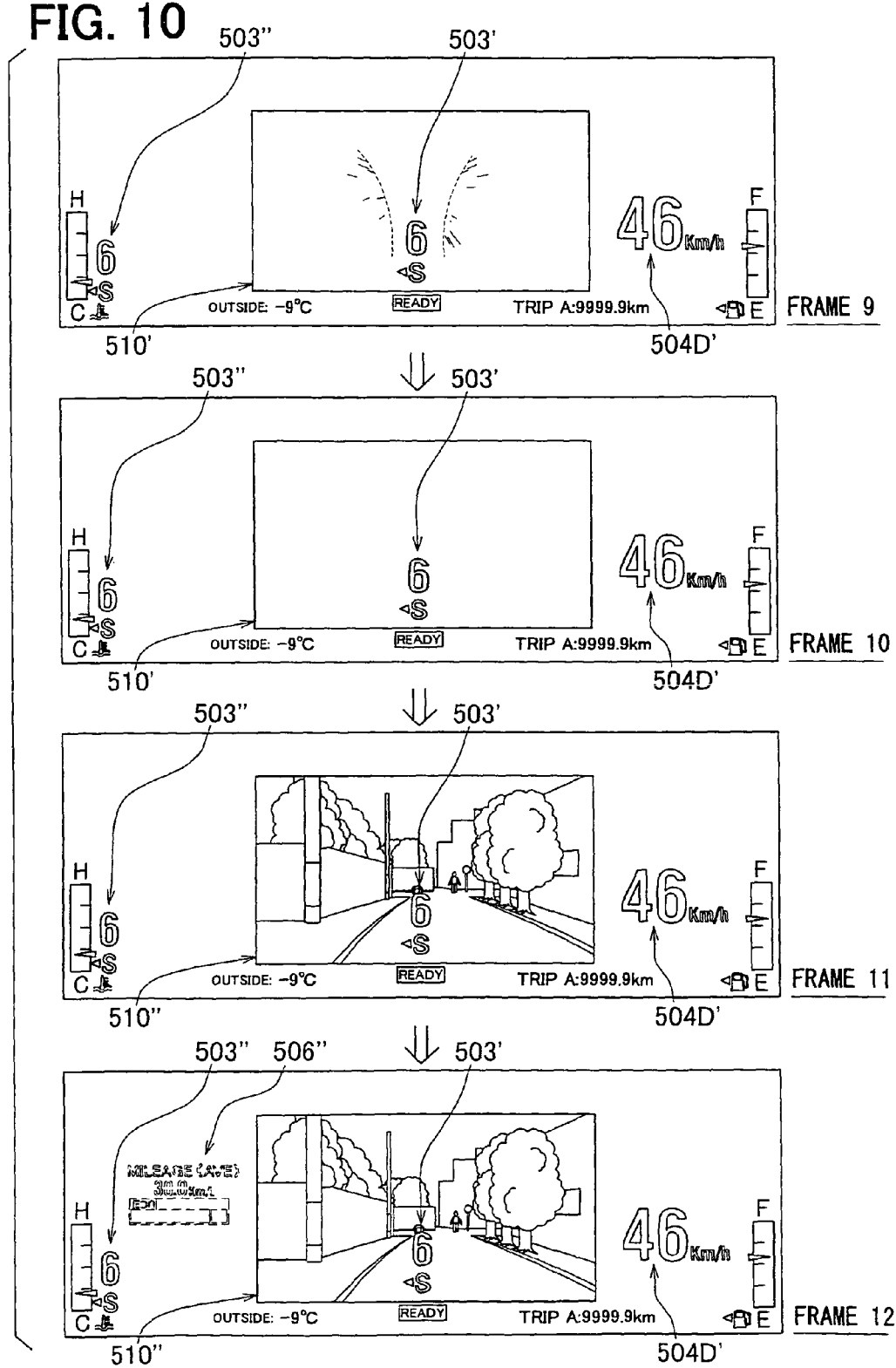
FIG. 10 is an explanatory diagram subsequent to FIG. 9.
Figure 11:
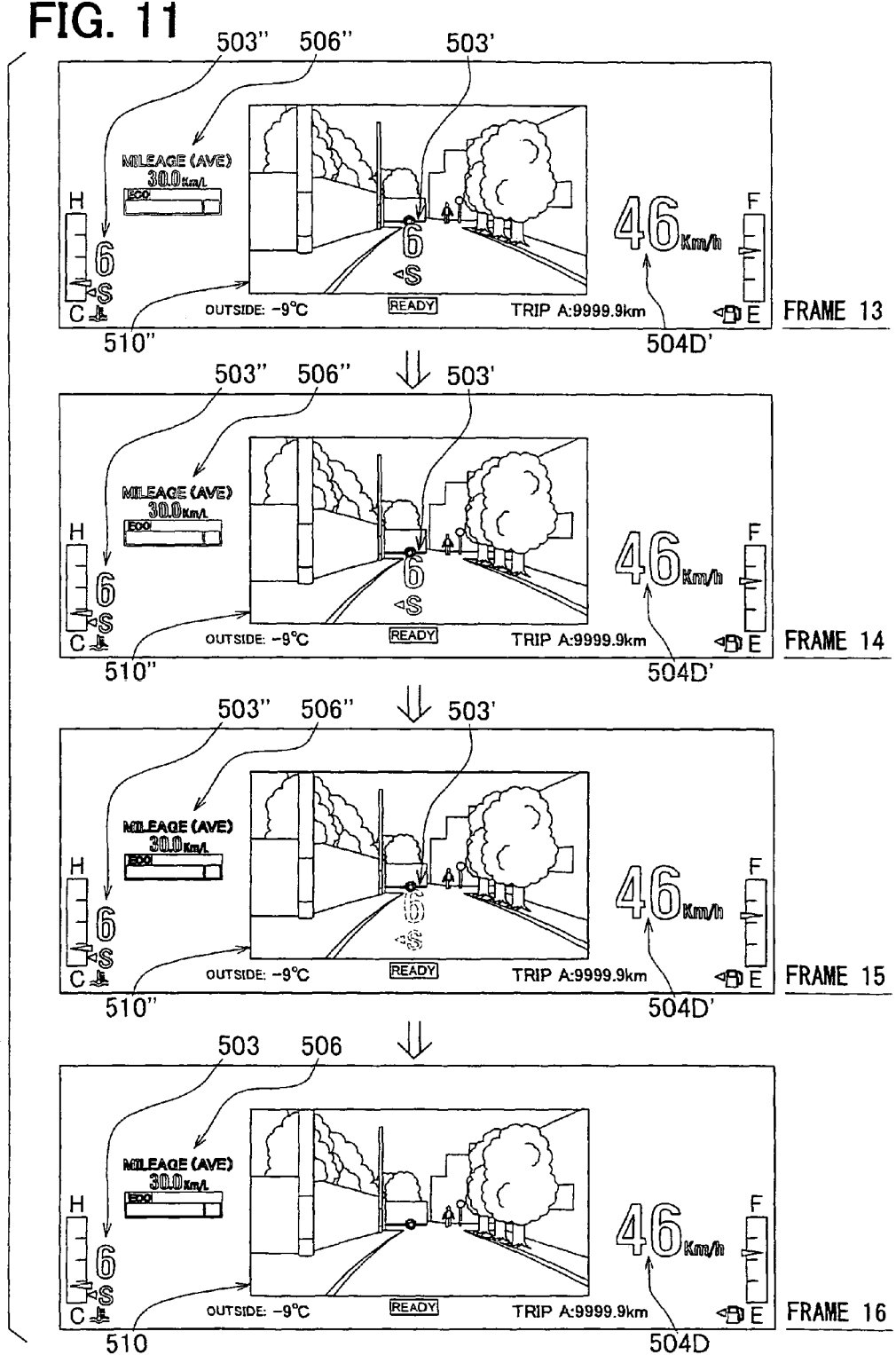
FIG. 11 is an explanatory diagram subsequent to FIG. 10.

When the display mode of the display 210 is switched from the first display mode shown in FIG. 1 to the second display mode shown in FIG. 2, a mode transition animation is displayed through the execution of the meter drawing software. The mode transition animation includes a moving image showing a transition process of the movement of the digital speed meter 504D, the average fuel consumption meter 506 and the gear position meter 503 constituting the common image function components from the display positions in the first display mode shown in FIG. 1 to the display positions in the second display mode shown in FIG. 2. The mode transition animation also includes a moving image displaying a gradual transition from the display state shown in FIG. 1 to an erasure state shown in FIG. 2 of the rotational pointer type analog speed meter 504A and the rotational pointer type analog output meter 501 constituting the first specific image function components. FIGS. 8 to 11 show an embodied example of the mode transition animation. A frame 1 in FIG. 8 is a start point frame of the animation and corresponds to the display screen in the first display mode shown in FIG. 1. A frame 16 in FIG. 11 is an end point frame of the animation and corresponds to the display screen in the second display mode shown in FIG. 2. The other frames 2 to 15 show a continuous flow of the moving image display between the frames 1 and 16.

Figure 4:
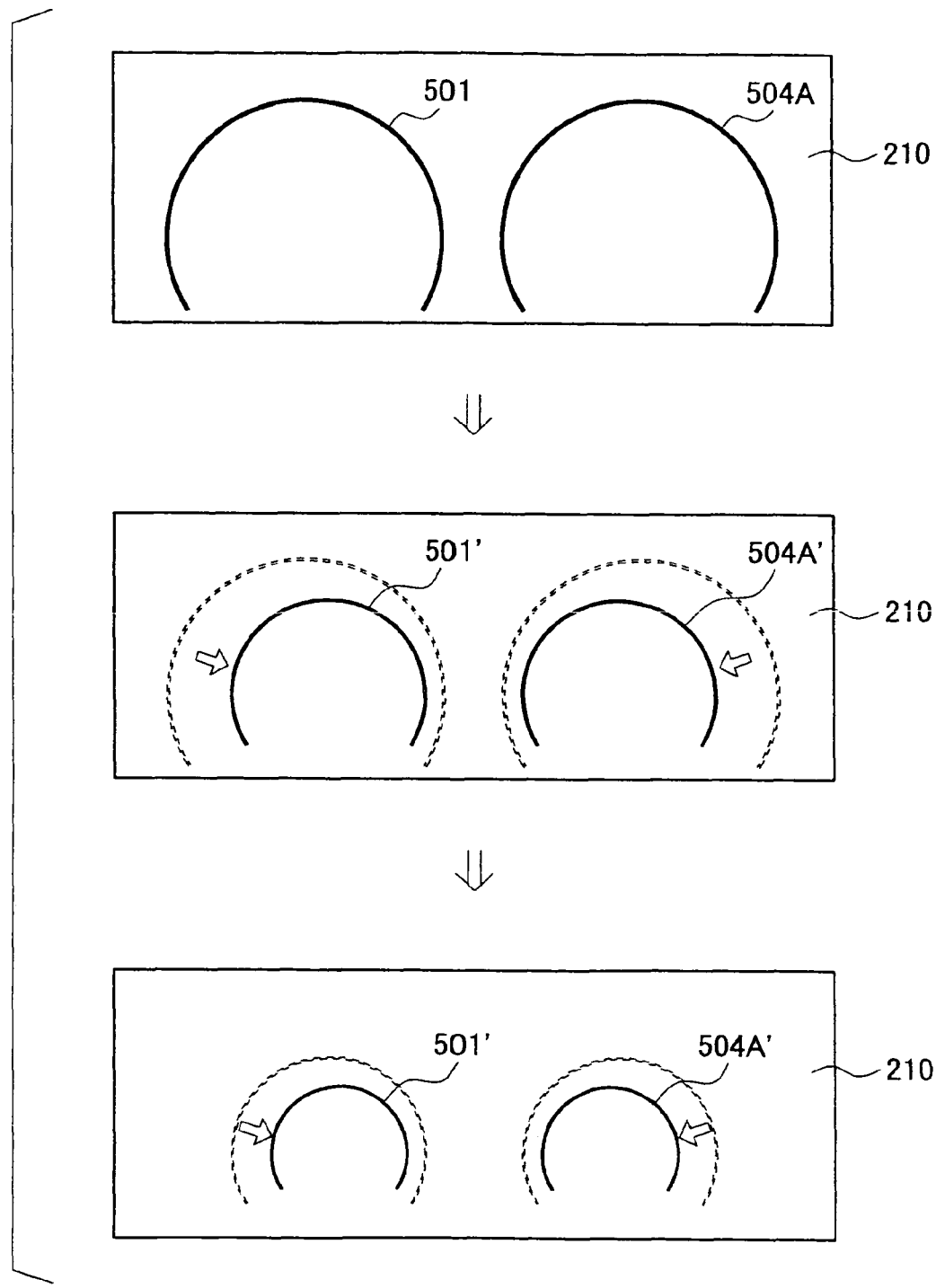
FIG. 4 is a diagram showing a first erasing mode of a pointer type analog meter constituting a first specific image function component in a mode transition animation according to the first embodiment.
Figure 5:
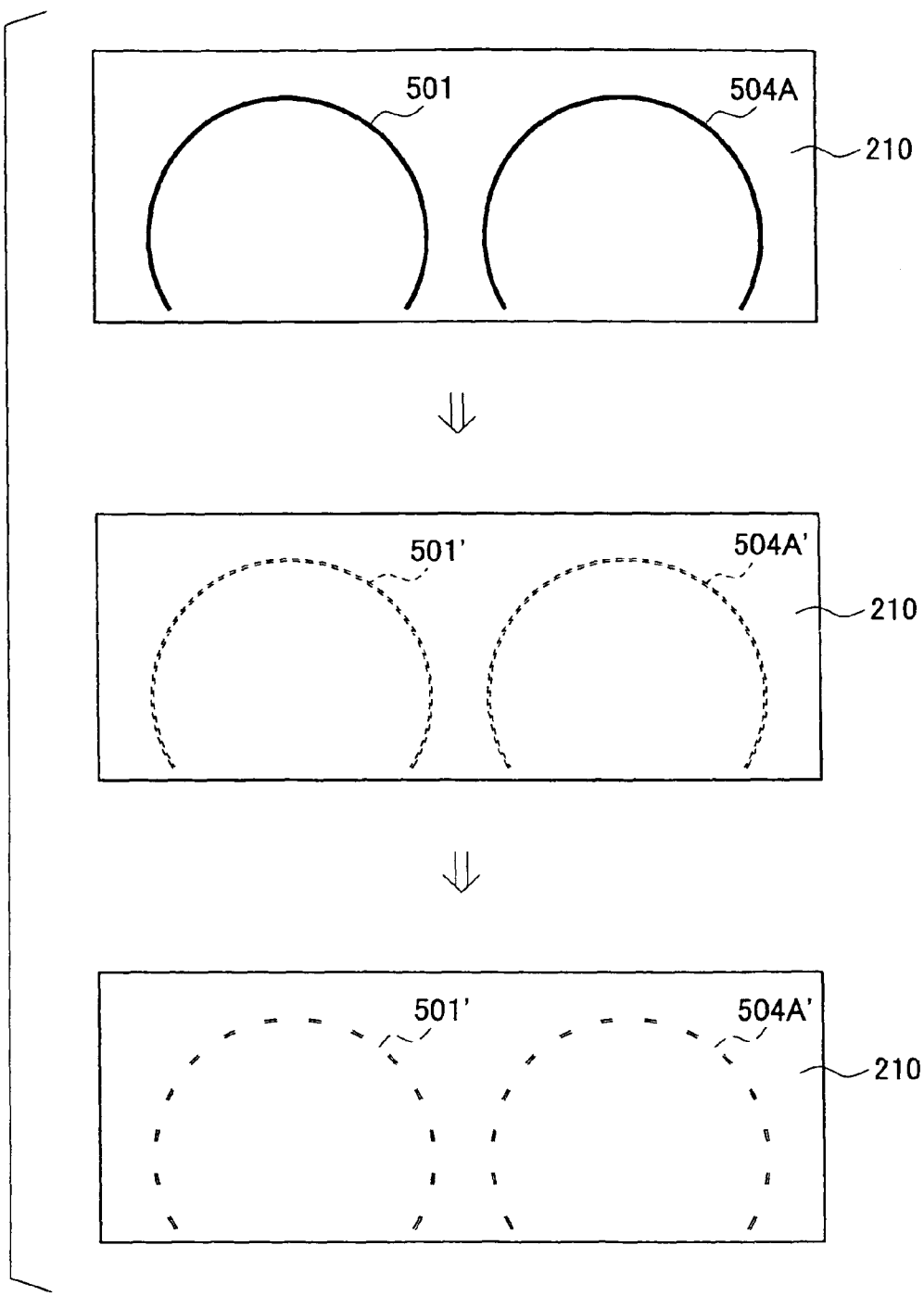
FIG. 5 is a diagram showing a second erasing mode according to the first embodiment.
Figure 6:
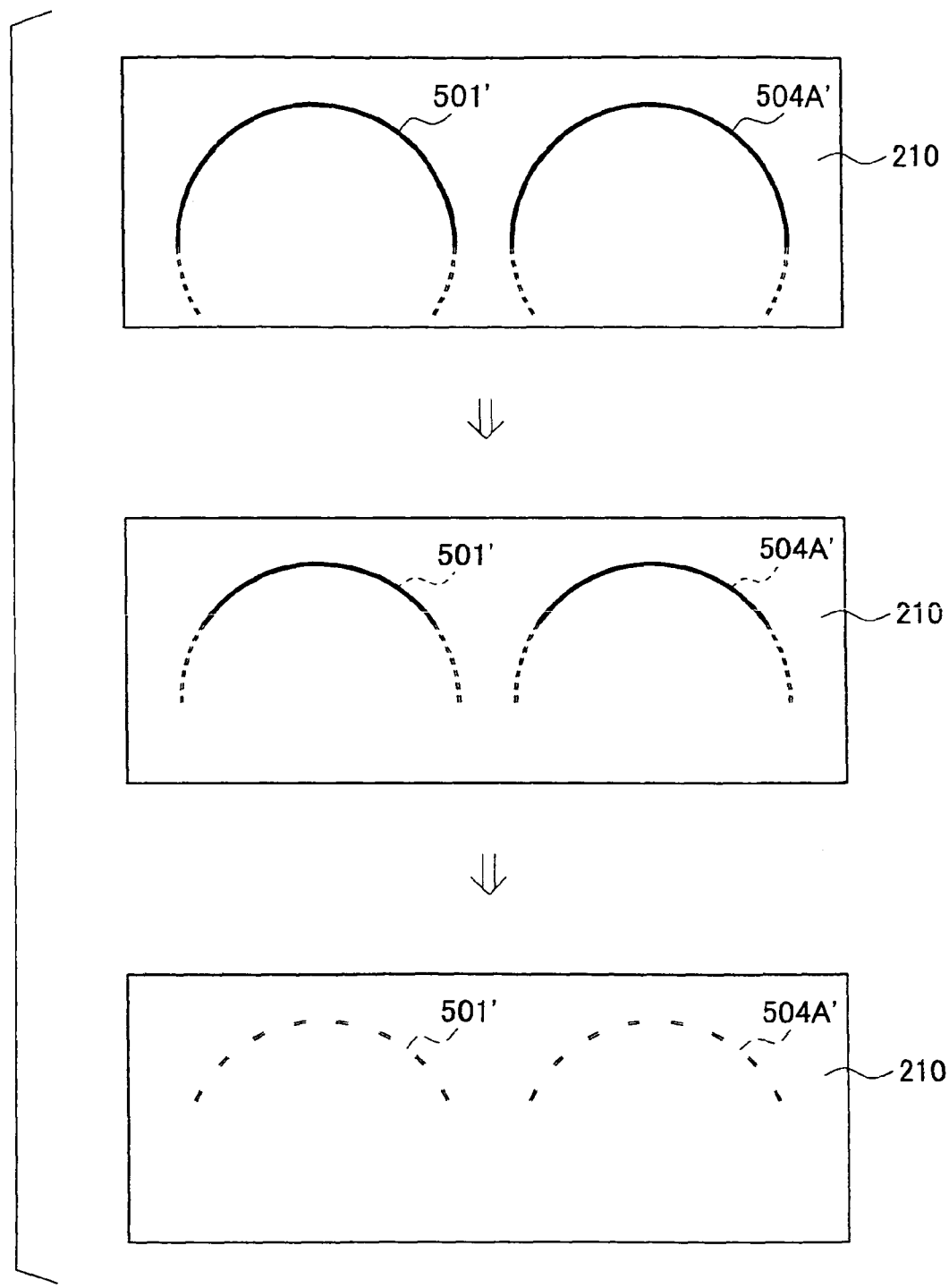
FIG. 6 is a diagram showing a third erasing mode according to the first embodiment.

In this example, a convergence point of the image contraction is conceptually set in the intermediate position between the rotational pointer type analog output meter 501 and the rotational pointer type analog speed meter 504A with respect to the horizontal direction. The moving image processing is performed such that the rotational pointer type analog output meter 501 and the rotational pointer type analog speed meter 504A fade out and disappear while gradually contracting toward the convergence point as shown in the frames 2 to 8 (of FIGS. 8 and 9). FIG. 4 schematically shows this process. At this time, afterimage processing is applied to the image meters 501, 504A in each frame. In addition, as described above, on the three-dimensional background (including the virtual projection plane HP) extending in the screen depth direction using the gradation provided by the virtual light source LS (FIG. 13) and the perspective, an innovative display effect is achieved as if the image meters 501 (501'), 504A (504A') fly away toward a distance indicated by the vanishing point. Alternatively, the image meters 501 (501'), 504A (504A') (i.e., the first specific image function components) may disappear while fading out as shown in FIG. 5. Alternatively, as shown in FIG. 6, the image meters 501 (501'), 504A (504A') may disappear in a swept manner in a direction from one end side toward the other end side along a predetermined erasing direction on the screen (a direction from the lower edge to the upper edge of the screen in the example of FIG. 6).

As shown in the frames 2 to 10 (in FIGS. 8 to 10), when the moving image for erasing the image meters 501, 504A starts, moving image processing for causing the image display window 510 to gradually emerge on the screen is performed in association with the start of the moving processing for erasing the image meters 501, 504A. In the example, the image display window 510 (510') emerges to gradually swell upward from the lower side of the screen to the upper side of the screen frame by frame. The image display window 510 (510') is in a no-image output state of outputting no image in the middle of displaying the moving image of the emergence. When arrival at the final display position in the second display mode is completed (i.e., when the frame 10 is achieved), a display object image (in this example, the night vision image) is displayed in the image display window 510 (510") (in the frames 11 to 16).

Figure 7:
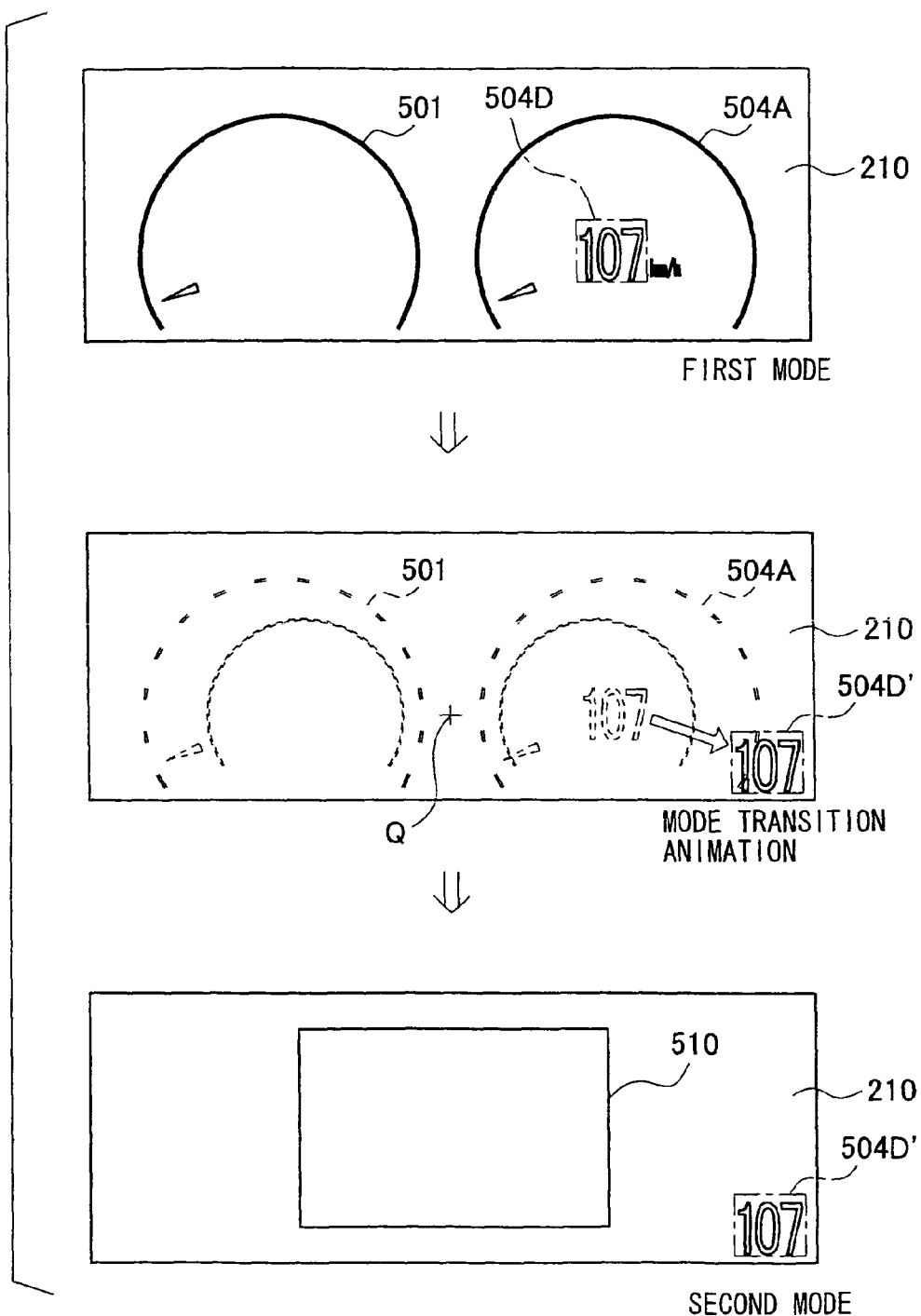
FIG. 7 is a diagram showing a moving mode of a digital speed meter constituting a common image function component in the mode transition animation according to the first embodiment.

As shown in the frame 1 (in FIG. 8), the digital speed meter 504D is displayed inside the rotational pointer type analog speed meter 504A. As apparently known from the comparison with the frame 16 (in FIG. 11), the display region of the image display window 510 in the second display mode overlaps with the display region of the digital speed meter 504D in the first display mode. Accordingly, the image display window 510 can interfere with the digital speed meter 504D when the image display window 510 swells upward. Therefore, in the example, the digital speed meter 504D (504D') starts moving toward the right margin of the image display window 510 (510') to dodge the image display window 510 (510') swelling upward (in the frame 3). Then, the digital speed meter 504D (504D') continues moving in parallel with the movement of the image display window 510 (510') (in the frames 3 to 7). When the digital speed meter 504D (504D') reaches a final display position in the second display mode, the moving image processing stops the movement of the digital speed meter 504D (504D') (in the frame 8). FIG. 7 schematically shows the process. It is apparent that the digital speed meter 504D (504D') is moving toward an outside of a side edge of the image display window 510 (a right edge side in FIG. 7) opposite to the contraction direction toward the convergence point Q of the rotational pointer type analog speed meter 504A.

Moving image processing of the average fuel consumption meter 506 (506') is performed such that the average fuel consumption meter 506 (506') does not perform the movement to dodge the image display window 510 (510') but fades out at the display position in the first display mode while being fixed to the same display position as shown in the frames 2 to 6. Separately from the processing, an average fuel consumption meter 506" is newly displayed at a final display position in the second display mode, which is set in the left margin of the image display window 510 (510"), such that the average fuel consumption meter 506" fades in at the final position (as shown in the frames 12 to 15). Moving image processing for the gear position meter 503 (503', 503") is similar to that of the average fuel consumption meter 506 (506', 506"). The average fuel consumption meter 506 (506") starts to fade in at the display position in the second display mode (from the frame 12) after the fade-out of the average fuel consumption meter 506 (506') at the display position in the first display mode is completer (until the frame 8). However, the gear position meter 503 (503") starts to fade in at the second display mode (in the frames 2 to 4) while the display of the gear position meter 503 (503') in the first display mode is continued (in the frames 1 to 12). After the display of the gear position meter 503 (503', 503") is continued simultaneously at both the positions for a certain period (in the frames 5 to 12), the display of the gear position meter 503 (503') in the first display mode fades out (in the frames 14 to 16).

Figure 12:
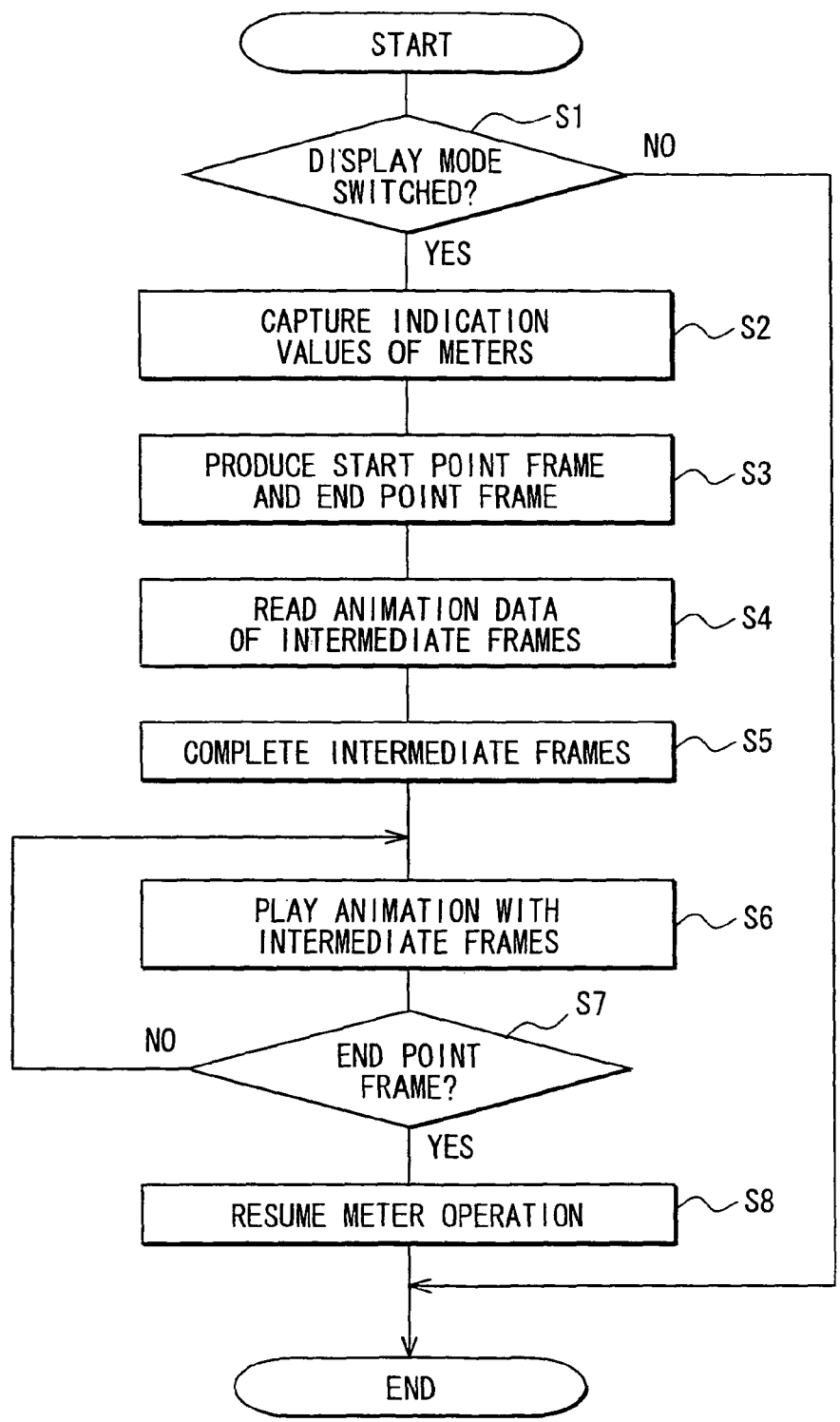
FIG. 12 is a flowchart showing an operation process flow of the mode transition animation according to the first embodiment.

FIG. 12 is a flowchart showing a flow of the display processing of the mode transition animation. When the switching of the display mode is detected in S1 (S means "step"), the indication values of the respective image meters as of the detection of the mode switching are captured in S2. Then, the frame 1 (i.e., the start point frame shown in FIG. 8) is produced by fixing the indication states of the image meters 503, 504A, 504D, 501, 506, 507, 509 in the first display mode and the frame 16 (i.e., the end point frame shown in FIG. 11) incorporating the image display window 510 is produced in S3. In S4, the animation data (shown in FIG. 3) that is made of bit map data and that indicates the display states of the respective image meters 503, 504A, 501, 506, 507, 509 and the image display window 510 other than the pointers for the respective intermediate frames (i.e., the frames 2 to 15). In S5, the pointer images are put in positions indicated by the respective captured indication values for the respective image meters 504A, 501, 506, 507, 509 each having the pointer in the bit map data of each intermediate frame. In regard to the digital speed meter 504D, a digit font indicating the captured speed value is read out from the font data shown in FIG. 3 and is put in the corresponding position on each frame along the movement track as the moving image. When the intermediate frames are completed in this way, the intermediate frames are played as the mode transition animation in S6. During the play, the display states of the respective image meters 503, 504A, 504D, 501, 506, 507, 509 are fixed to the captured indication values respectively. When the end point frame 16 is reached in S7, the process goes to S8, in which the obtainment of the indication values of the respective image meters is resumed and the display operation in the second display mode is started.

The putting processing of the pointer images in S5 to the respective intermediate frames may be omitted. In this case, the image meters 504A, 501, 506, 507, 509 each having the pointer are brought to a state where the pointers are erased for a moment.

The switching from the first display mode to the second display mode is explained above. In the switching from the second display mode to the first display mode, a mode transition animation changing in the reverse direction may be displayed. Alternatively, in view of a situation where a driver is familiar with the layout and the like in the first display mode as a usual setting state, the mode transition animation may not be displayed particularly.

Figure 14:
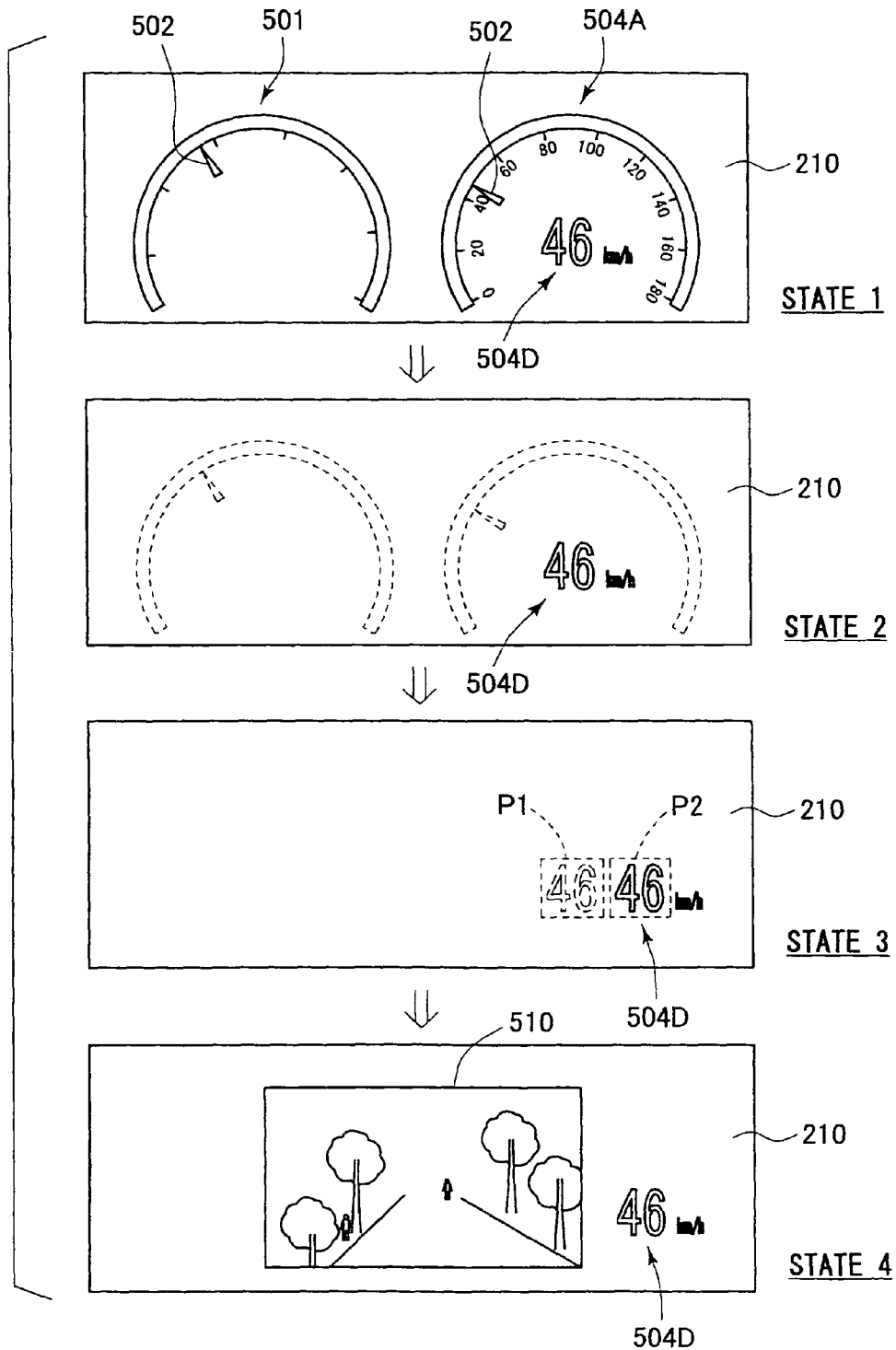
FIG. 14 is a schematic diagram showing a transition sequence from a first display mode to a second display mode according to a second embodiment of the present invention.

Next, a second embodiment of the present invention will be described with reference to the drawings. FIG. 14 schematically shows an image processing sequence at the time when the display mode is switched from the first display mode shown in FIG. 1 to the second display mode shown in FIG. 2. As shown in a state 1, both of the digital speed meter 504D and the pointer type analog speed meter 504A are displayed in the first display mode. As contrasted thereto, the pointer type analog speed meter 504A is erased as the display mode is switched to the second display mode as shown in a state 2. In FIG. 14, image control is performed such that the image state displaying the pointer type analog speed meter 504A in the first display mode directly switches to the image state showing the completion of the erasure of the same as shown in the state 2 without going through an intermediate state. That is, the image control of completing the transition in a single frame is performed.

As shown in a state 3, the digital speed meter 504D moves from a specific first position P1 as a display position in the first display mode to a specific second display position as a display position in the second display mode set in a right or left margin (right margin in this example) outside the image display window 510 to avoid an overlap with the image display window 510 (which is a subsidiary information output section). When the display mode is switched from the first display mode to the second display mode, the digital speed meter 504A is directly switched from the displayed state in the first position P1 to the displayed state in the second display position P2 not via a display state at an intermediate position between the first display position P1 and the second display position P2. That is, the image control of the digital speed meter 504D is performed such that the digital speed meter 504D moves from the first position P1 to the second position P2 in the single frame. The digit image indicating the speed indication value of the digital speed meter 504D is set such that the font and the display size of the digit image are the same between the first display mode and the second display mode.

Figures 17, 18:
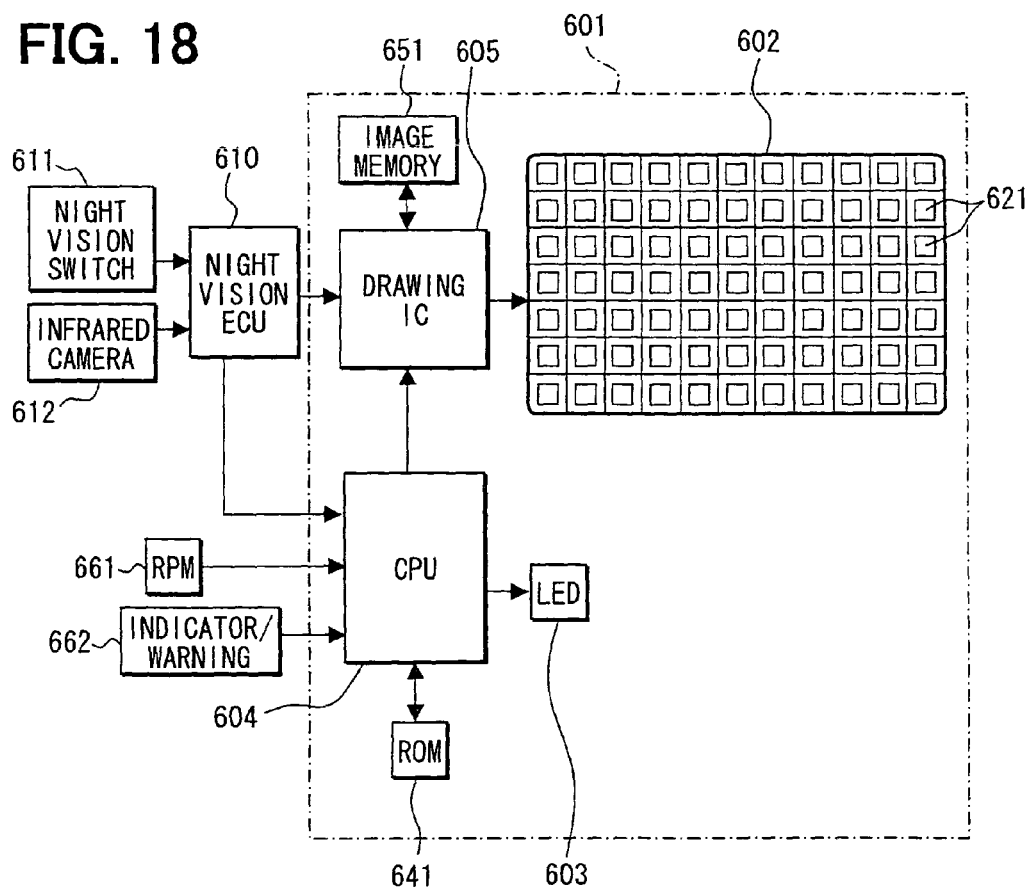
FIG. 17 is a diagram showing an example of font alteration of a digital image of a digital speed meter accompanying switching of a display mode according to the second embodiment.
FIG. 18 is a circuit structure diagram showing a display device according to a third embodiment of the present invention.

Alternatively, as shown in FIG. 17, only the display size of the digit image indicating the speed indication value of the digital speed meter 504D may be set the same in the first and second display modes and the font of the digit image may be differentiated between the first and second display modes. In the example of FIG. 17, the digit image is displayed in the normal font in the first display mode and is displayed in the bold face (upper one in FIG. 17) or in italics (lower one in FIG. 17) in the second display mode. The display state around the digital speed meter 504A largely changes between the first display mode and the second display mode also because of the erasure of the pointer type analog speed meter 504A. Accordingly, there is a possibility that the visually recognized dimensions look different due to optical illusion even when the sizes of the digit images are the same. Therefore, in the example, for fine adjustment, the display size of the digit image may be slightly differentiated between the first and second display modes. Moreover, in the second display mode in which the speed is indicated only by the digital speed meter 504D, the display size of the digit image may be set larger in the second display mode than in the first display mode for achieving emphasis.

When the pointer type analog speed meter 504A is erased, the digital speed meter 504 is maintained at the first position P1 (refer to the state 3) as the display position in the first display mode until the erasure completes. At that time, setting can be made such that the digital speed meter 504D maintains the display state in the first display position P1 for a predetermined period (for example, 0.1 to 1 second) after the erasure of the pointer type analog speed meter 504A is completed as shown in the state 2 and then moves to the second position P2 as shown in the state 3.

Alternatively, a transition from the display state in the first display mode of the state 1 to the image state, in which both of the erasure of the pointer type analog speed meter 504A and the movement of the digital speed meter 504D to the second position P2 are completed as shown in the state 3, may be made in a single frame by skipping the state 2.

Then, the image display window 510 is displayed as shown in a state 4 of FIG. 14. In this example, the display state is switched in a single frame directly from the state, in which the image display window 510 is not displayed, to the state 4, in which the entirety of the image display window 510 is displayed. Alternatively, the transition from the display state in the first display mode of the state 1 to the display state of the state 4 may be made in a single frame by skipping the states 2 and 3.

Also, a mode transition animation can be displayed and output through execution of the meter drawing software when the display mode of the display 210 is switched from the first display mode of FIG. 1 to the second display mode of FIG. 2 as in the first embodiment. The mode transition animation includes a moving image of displaying the pointer type analog speed meter 504A and the pointer type analog output meter 501 constituting the first specific image function components in FIG. 1 such that the display state of the pointer type analog speed meter 504A and the pointer type analog output meter 501 gradually changes toward the erasure state shown in FIG. 2.

In this example, a convergence point of the image contraction is conceptually set in the intermediate position between the pointer type analog output meter 501 and the pointer type analog speed meter 504A with respect to the horizontal direction in which the meters 501, 504A are arranged side by side. The moving image processing is performed such that the pointer type analog output meter 501 and the pointer type analog speed meter 504A fade out and disappear while gradually contracting toward the convergence point (as shown in FIG. 4). At this time, afterimage processing is applied to the image meters 501 (501'), 504A (504A') in each frame. In addition, in the three-dimensional background (including the virtual projection plane HP) in the screen depth direction using the gradation provided by the virtual light source LS (FIG. 13) and the perspective as described above, an innovative display effect is achieved as if the image meters 501 (501'), 504A (504A') fly away toward a distance indicated by the vanishing point. Alternatively, the image meters 501 (501'), 504A (504A') (i.e., the first specific image function components) may disappear while fading out as shown in FIG. 5. Alternatively, as shown in FIG. 6, the image meters 501 (501'), 504A (504A') may disappear in a swept manner in a direction from one end side toward the other end side along a predetermined erasing direction on the screen (a direction from the lower edge to the upper edge of the screen in the example of FIG. 6).

At this time, the display control of the digital speed meter 504D can be set such that the digital speed meter 504D is held at the first position P1 (refer to the state 3) as the display position in the first display mode until the moving image for gradually erasing the pointer type analog speed meter 504A is completed. In this case, the digital speed meter 504D may be moved to the second position after the display state at the first position is maintained for a predetermined period after the moving image is completed. Alternatively, the digital speed meter 504D may be moved to the second position immediately after the moving image is completed since the user can strongly recognize that the mode switching is in progress if the erasure of the pointer type analog speed meter 504A is shown in the moving image. Alternatively, the movement of the digital speed meter 504D to the second position may be performed in the middle of the display period of the moving image.

Figure 15:
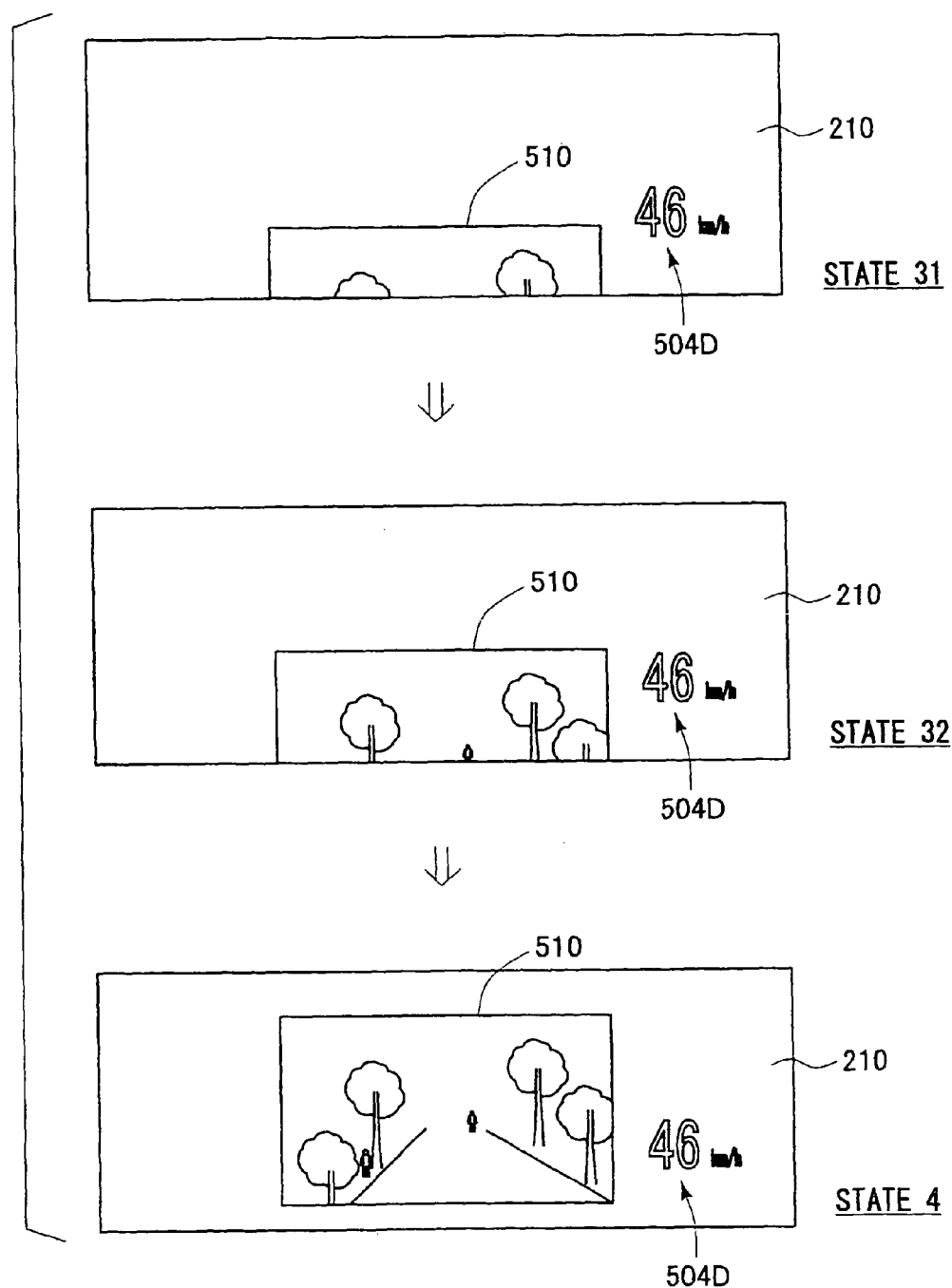
FIG. 15 is a schematic diagram showing an example of a mode transition animation concerning emergence of an image display window according to the second embodiment.
Figure 16:
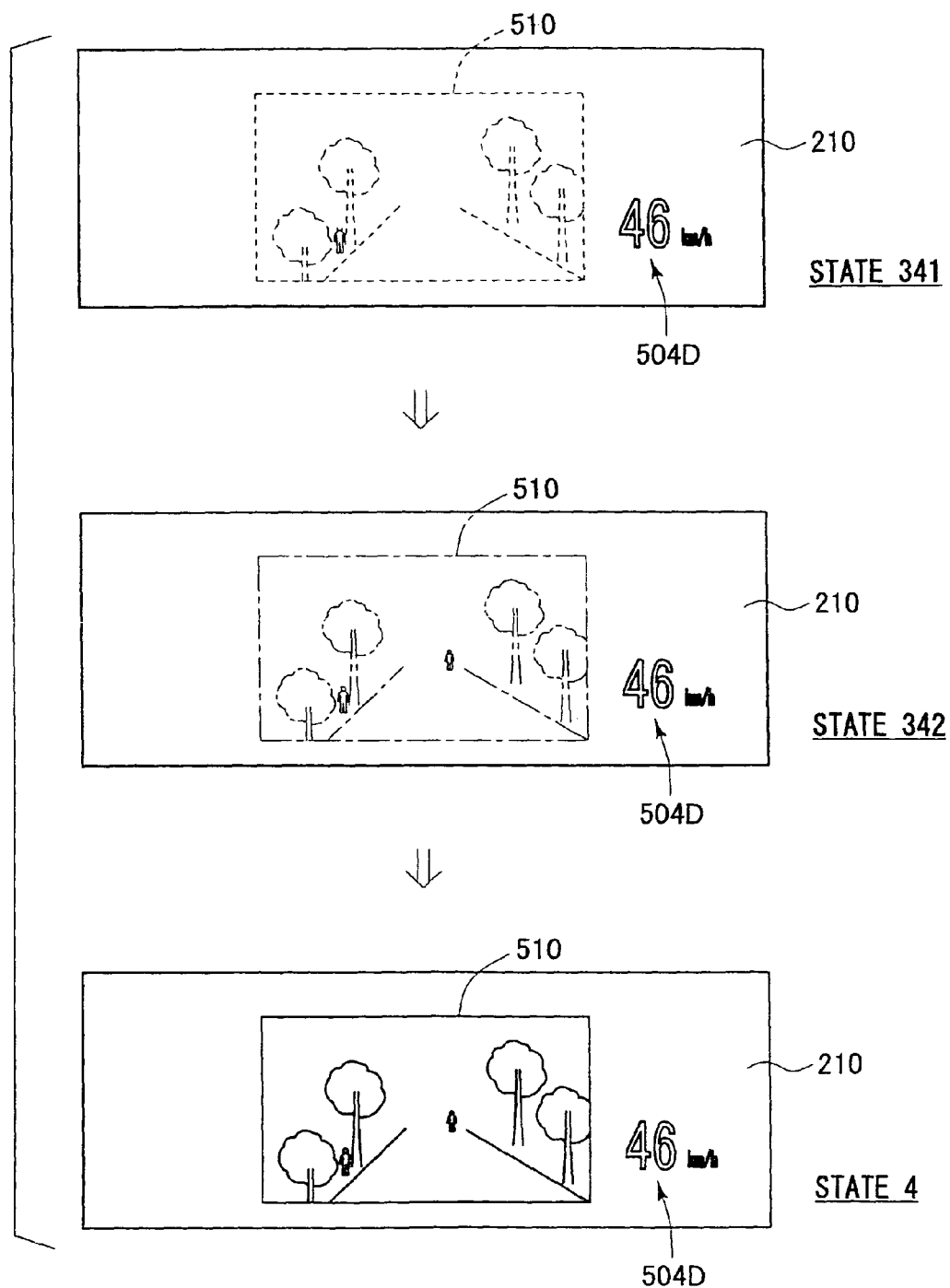
FIG. 16 is a schematic diagram showing another example of the mode transition animation concerning the emergence of the image display window according to the second embodiment.

Moving image processing for causing the image display window 510 to gradually emerge onto the screen may be performed as shown in FIGS. 15 and 16. FIG. 15 shows an example of the moving image for causing the image display window 510 to gradually swell upward from the lower side of the screen frame by frame (in the order of a state 31, a state 32 and the state 4). FIG. 16 shows an example of the moving image for causing the image display window 501 to fade in (in the order of a state 341, a state 342 and the state 4).

In this case, it is preferable that the movement of the digital speed meter 504D to the second position P2 is completed before the moving image for causing the image display window 510 to gradually emerge onto the screen is started. In the case where the image display window 510 gradually swells upward onto the screen frame by frame, the display state of the digital speed meter 504D at the first position P1 may be maintained even after the start of the moving image in a period in which the image display window 510 does not overlap with the digital speed meter 504D displayed at the first position P1. The display period of the moving image of the erasure of the pointer type analog speed meter 504A may partly overlap with a display period of the moving image of the emergence of the image display window 510. For example, an end side part of a period of the moving image of the erasure of the pointer type analog speed meter 504A may overlap with a start side period of the moving image of the emergence of the image display window 510. Thus, the two moving images can be displayed in the overlapped manner during the period.

Also in the second embodiment, the display processing of the mode transition animation of the first embodiment shown in FIG. 12 may be executed.

Next, a display device according to a third embodiment of the present invention will be explained with reference to the drawings. A display device 601 shown in FIG. 18 is used as an in-vehicle display device, for example. The display device 601 has a liquid crystal panel 602 as a display panel, a light-emitting diode 603, CPU 604 (central processing unit) as a controller, a drawing IC 605 (integrated circuit), ROM 641 (read-only memory) and an image memory 651 capable of rewriting storage data.

The liquid crystal panel 602, in which multiple pixels 621 are formed in a matrix shape, is a liquid crystal panel of an active matrix type driven by a thin film transistor (TFT) (not shown). Each pixel 621 incorporates a red pixel, a green pixel and a blue pixel. Voltage is applied to a gate of the TFT to control voltage applied to the red pixel, the green pixel and the blue pixel in each pixel 621. Thus, respective optical transmittances of the red pixel, the green pixel and the blue pixel in each pixel 621 are controlled. The light-emitting diode 603 emitting white light is a light source located behind the liquid crystal panel 602 to illuminate the liquid crystal panel 602 in a transmissive manner. The light-emitting diode 603 is lit by the CPU 604. Full-color display of the liquid crystal panel 602 is performed by illuminating the pixels 621, in each of which the optical transmittances of the red pixel, the green pixel and the blue pixel are controlled, with the light-emitting diode 603 in the transmissive manner.

The CPU 604 takes in signals of a rotation sensor 661 for sensing engine rotation speed (rpm) of a vehicle as first information and the like and inputs the signals to the drawing IC 605. The CPU 604 further takes in signals of an indicator/warning sensor 662 relating to an indicator for informing an operating state of devices equipped in the vehicle and relating to warning of an abnormality in the vehicle and the like and inputs the signals to the drawing IC 605. The ROM 641 stores various image data such as a rotation meter image 607 and a speed meter image 608 as first display images and indicator/warning images 691-694*b* shown in FIGS. 19A to 19C.

Figure 19A:
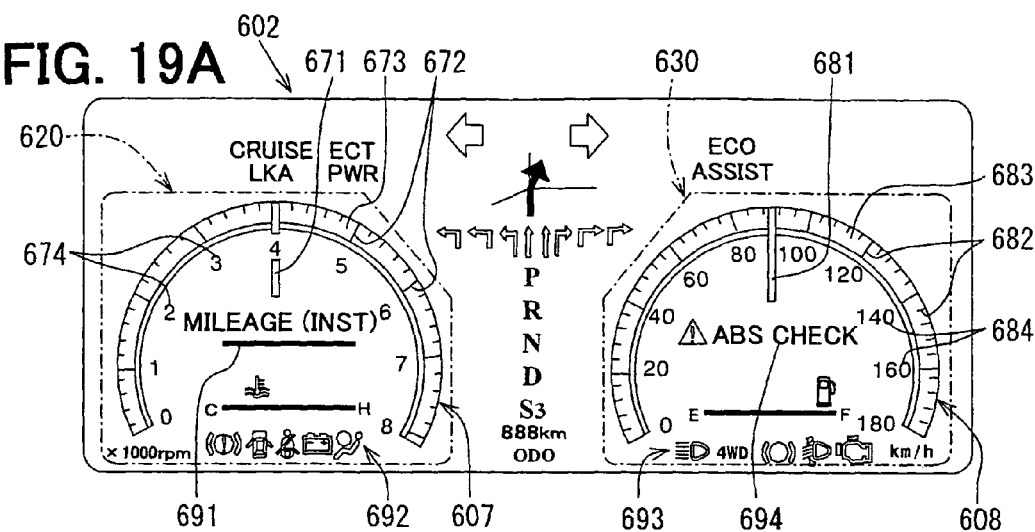
FIG. 19A is a front view showing a liquid crystal panel displaying first display images according to the third embodiment.
Figure 19B:
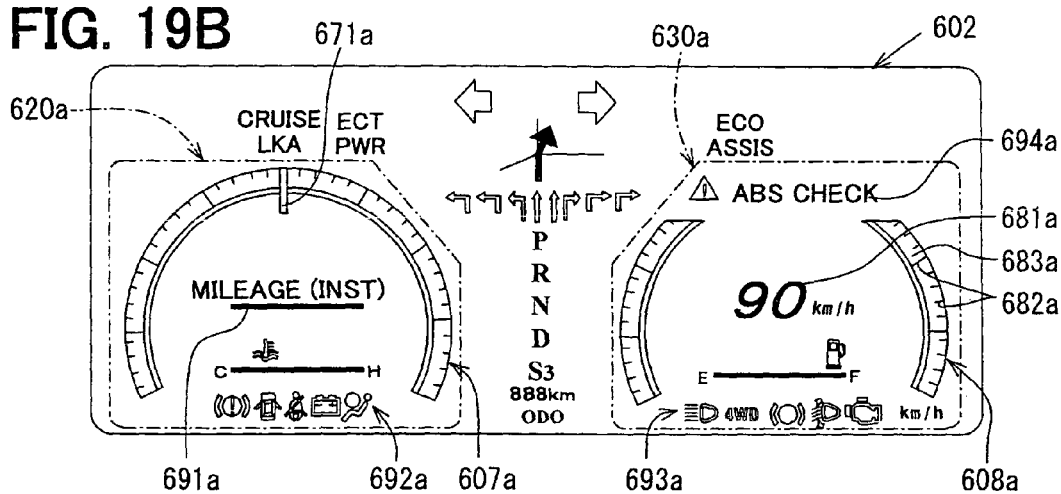
FIG. 19B is a front view showing the liquid crystal panel displaying intermediate images according to the third embodiment.
Figure 19C:
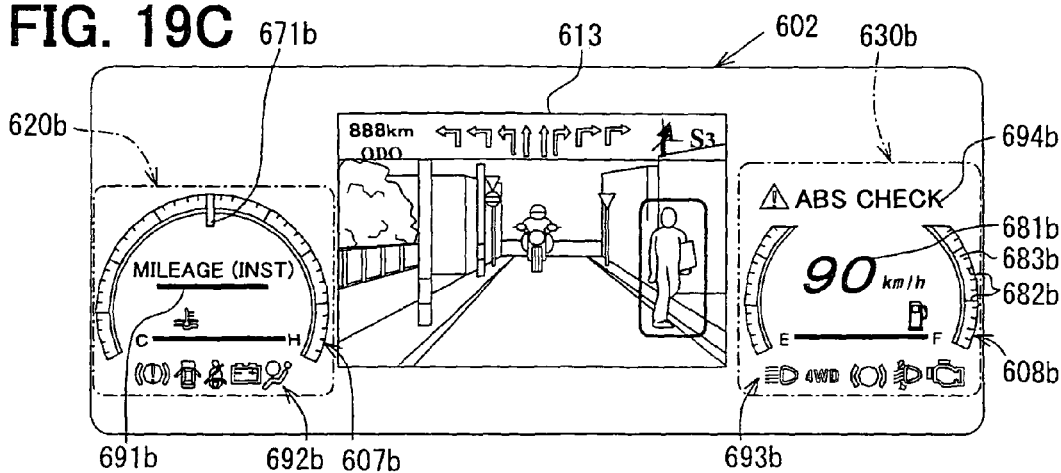
FIG. 19C is a front view showing the liquid crystal panel displaying contraction images according to the third embodiment.

The image data is transferred from the ROM 641 to the image memory 651 in response to a command from the CPU 604. The drawing IC 605 controls the voltage applied to each of the red pixel, the green pixel and the blue pixel in each pixel 621 based upon the image data of the image memory 651 and the inputted first information or the indicator/warning information to control the display state of each the multiple pixels 621. Thus, as shown in FIGS. 19A to 19C, the rotation meter image 607, the speed meter image 608, the indicator/warning images 691-694*b* and the like are displayed on the liquid crystal panel 602.

If a night vision switch 611 is turned on, the CPU 604 receives an ON signal of the night vision switch 611 through a night vision ECU 610 (electronic control unit) and inputs a signal of a night image taken by an infrared camera 612 as second information to the drawing IC 605 through the night vision ECU 610. The infrared camera 612 takes the night image by reflection of an infrared light irradiated from a front part of the vehicle. In response to a command from the CPU 604, the drawing IC 605 controls the voltages respectively applied to the red pixel, the green pixel and the blue pixel in each pixel 621 based upon the signal of the night image to control the display state of each of the multiple pixels 621. Thus, as shown in FIG. 19C, a night vision image 613 as a second display image is displayed on the liquid crystal panel 602. When the night vision switch 611 is turned off, the night vision image 613 is not displayed on the liquid crystal panel 602 as shown in FIG. 19A.

The rotation meter image 607 is an image indicating a rotation meter showing the engine rotation speed (rpm) of the vehicle and is provided with a pointer image 671 indicating a pointer rotating with increase/decrease of the engine rotation speed, a scale image 672 indicating a scale pointed by the pointer and a character image 674 indicating characters pointed by the pointer. The scale image 672 is displayed within a scale region 673.

The speed meter image 608 is an image indicating a speed meter displaying speed of the vehicle as the first information. Like the rotation meter image 607, the speed meter image 608 is provided with a pointer image 681 indicating a pointer rotating with increase/decrease of the speed of the vehicle, a scale image 682 indicating a scale pointed by the pointer and a character image 684 indicating characters pointed by the pointer. The scale image 682 is displayed within a scale region 683. The indicator/warning images 691-694*b* are images indicating indicators and warnings.

Next, the display switching of the rotation meter image 607 and the speed meter image 608 according to the present embodiment will be explained with reference to FIGS. 19A to 19C.

The rotation meter image 607 shown in FIG. 19A is displayed on the liquid crystal panel 602 when the night vision switch 611 is off. The display is switched from the rotation meter image 607 to an intermediate image 607*a* shown in FIG. 19B when the night vision switch 611 is turned on. While a predetermined period (for example, one second) elapses after the night vision switch 611 is turned on, the intermediate image 607*a* is gradually contracted to a size of a contraction image 607*b* shown in FIG. 19C to switch the display from the intermediate image 607*a* to the contraction image 607*b*.

The contraction image 607*b* is an image indicating the same engine rotation speed of the vehicle as the engine rotation speed indicated by the rotation meter image 607. However, the contraction image 607*b* is an image that is contracted from the rotation meter image 607 and that has a form different from that of the rotation meter image 607. In the present embodiment, the pointer image 671 of the rotation meter image 607 is altered to a pointer image 671*b* in the contraction image 607*b* shorter than the pointer image 671 and the character image 674 of the rotation meter image 607 is not displayed in the contraction image 607*b*. Along with the switching of the display from the rotation meter image 607 to the contraction image 607*b*, the positions of the indicator/warning images 691, 692 in FIG. 19A are changed to positions of indicator/warning images 691*b*, 692*b* shown in FIG. 19C.

The intermediate image 607*a* is an image that indicates the same engine rotation speed of the vehicle with a pointer image 671*a* as the engine rotation speed indicated by the rotation meter image 607 and has the same size as the rotation meter image 607. The intermediate image 607*a* is an image that has a form different from the rotation meter image 607 but the same form as the contraction image 607*b*. A relative positional relationship between the intermediate image 607*a* and the indicator/warning images 691*a*, 692*a* is set the same as a relative positional relationship between the contraction image 607b and the indicator/warning images 691b, 692b.

In this way, the changes in both of the form and the size of the image due to the switching of the display between the rotation meter image 607 and the contraction image 607b can be separated into the change of the form of the image due to the switching of the display between the rotation meter image 607 and the intermediate image 607b and the change of the size of the image due to the switching of the display between the contraction image 607b and the intermediate image 607a. Therefore, the change of the image due to the switching of the display between the rotation meter image 607 and the contraction image 607b can be moderated.

Since the intermediate image 607a is gradually contracted to the size of the contraction image 607b, the change of the size of the image due to the switching of the display from the intermediate image 607a to the contraction image 607b can be moderated. Accordingly, the change of the image due to the switching of the display from the rotation meter image 607 to the contraction image 607b can be moderated further.

The relative positional relationship between the intermediate image 607a and the indicator/warning images 691a, 692a is set the same as the relative positional relationship between the contraction image 607b and the indicator/warning images 691b, 692b. Therefore, the change of the image due to the switching of the display from the rotation meter image 607 including the indicator/warning images 691, 692 to the contraction image 607b including the indicator/warning images 691b, 692b can be moderated further.

The image is contracted from the rotation meter image 607 to the contraction image 607b but the form and the size of each image are not changed from the indicator/warning images 691, 692 to the indicator/warning images 691b, 692b. Therefore, the contraction does not cause difficulty in the recognition of the indicator/warning images 691b, 692b.

Also in the case of the speed meter image 608, like the rotation meter image 607, the speed meter image 608 shown in FIG. 19A is displayed on the liquid crystal panel 602 when the night vision switch 611 is off. The display is switched from the speed meter image 608 to an intermediate image 608a shown in FIG. 19B when the night vision switch 611 is turned on. While the aforementioned predetermined period elapses after the night vision switch 611 is turned on, the intermediate image 608a is gradually contracted to a size of a contraction image 608b shown in FIG. 19C to switch the display from the intermediate image 608a to the contraction image 608b.

The contraction image 608b is an image indicating the same speed of the vehicle as the speed indicated by the speed meter image 608 but is an image that is contracted from the speed meter image 608 and that has a form different from the speed meter image 608. In the present embodiment, the pointer image 681 of the speed meter image 608 is altered to a speed image 681b in the contraction image 608b and the character image 684 of the speed meter image 608 is not displayed in the contraction image 608b. The scale region 683 of the speed meter image 608 is altered to a scale region 683b in the contraction image 608b. Thus, the position of the indicator/warning image 694 in FIG. 19A is changed to the position of the indicator/warning image 694b in FIG. 19C such that the indicator/warning image 694b is displayed to overlap with the scale region 683b. That is, the scale region 683b is not displayed in a region where the scale region 683b overlaps with the indicator/warning image 694b. A scale image 682b is displayed within the scale region 683b.

Along with the switching of the display from the speed meter image 608 to the contraction image 608b, the position of the indicator/warning image 693 in FIG. 19A is changed to the position of the indicator/warning image 693b in FIG. 19C.

The intermediate image 608a is an image indicating the same speed of the vehicle as the speed indicated by the speed meter image 608. The intermediate image 608a has the same size as the speed meter image 608. The intermediate image 608a has a form that is different from the speed meter image 608 but is the same as the contraction image 608b. The relative positional relationship between the intermediate image 608a and the indicator/warning images 693a, 694a is set the same as the relative positional relationship between the contraction image 608b and the indicator/warning images 693b, 694b. A speed image 681a, a scale image 682a and a scale region 683a of the intermediate image 608a are shown in FIG. 19B.

Thus, also in the speed meter image 608, as in the case of the rotation meter image 607, the changes in both of the form and the size of the image due to the switching of the display between the speed meter image 608 and the contraction image 608b can be separated into the change of the form due to the switching of the display between the speed meter image 608 and the intermediate image 608a and the change of the size due to the switching of the display between the contraction image 608b and the intermediate image 608a. Accordingly, the change of the image due to the switching of the display between the speed meter image 608 and the contraction image 608b can be moderated.

Since the intermediate image 608a is gradually contracted to the size of the contraction image 608b, the change of the size due to the switching of the display from the intermediate image 608a to the contraction image 608b can be moderated. Accordingly, the change of the image due to the switching of the display from the speed meter image 608 to the contraction image 608b can be moderated further.

The relative positional relationship between the intermediate image 608a and the indicator/warning images 693a, 694a is set the same as the relative positional relationship between the contraction image 608b and the indicator/warning images 693b, 694b. Accordingly, the change of the image due to the switching of the display from the speed meter image 608 including the indicator/warning images 693, 694 to the contraction image 608b including the indicator/warning images 693b, 694b can be further moderated.

The image is contracted from the speed meter image 608 to the contraction image 608b but the form and the size of each image are not changed from the indicator/warning images 693, 694 to the indicator/warning images 693b, 694b. Therefore, the contraction does not cause difficulty in the recognition of the indicator/warning images 693b, 694b.

As shown in FIG. 19C, when the display is switched to the contraction images 607b, 608b, the night vision image 613 is displayed by using a region made by subtracting a region where the contraction images 607b, 608b are displayed from a region where the rotation meter image 607 and the speed meter image 608 were displayed. Thus, the region produced by switching the display to the contraction images 607b, 608b can be effectively used and therefore, many pieces of information can be displayed in a limited space.

As described above, the display device 601 according to the present embodiment has the liquid crystal panel 602, the CPU 604 and the drawing IC 605. The liquid crystal panel 602 is the display panel, in which the multiple pixels 621 are formed in the matrix shape. The CPU 604 and the drawing IC 605 constitute the controller for switching the display of the liquid crystal panel 602 among the rotation meter image 607 as the first display image indicating the engine rotation speed of the vehicle as the first information, the contraction image 607b indicating the engine rotation speed of the vehicle in the form that is contracted from the rotation meter image 607 and that is different from the rotation meter image 607, and the intermediate image 607a indicating the engine rotation speed of the vehicle in the same size as the rotation meter image 607 and in the form that is the same as or similar to the contraction image 607b. When the display is switched between the rotation meter image 607 and the contraction image 607b, the display is switched to the intermediate images 607a, 608a in the middle of the switching of the display. Thus, the change of the image due to the switching of the display between the first display image and the contraction image can be moderated.

The third embodiment may be modified, for example, as follows. That is, though an example of a case where the night vision switch 611 is turned on is explained in the third embodiment, the same can be applied to a case where the night vision switch 611 is turned off. In this case, the display is switched from the contraction image 607b to the intermediate image 607a and then to the rotation meter image 607. Likewise, the display is switched from the contraction image 608b to the intermediate image 608a and then to the speed meter image 608.

In the third embodiment, the intermediate images 607a, 608a respectively have the same forms as the contraction images 607b, 608b. Alternatively, the intermediate images 607a, 608a may have forms similar to those of the contraction images 607b, 608b. With this configuration, an effect similar to the aforementioned effect can be achieved.

It should be noted that the display image is not limited to the rotation meter image 607 or the speed meter image 608. Alternatively, a display image other than the pointer meter image indicating the pointer meter may be used.

It should be noted that the display image is not limited to the display image indicating each piece of information such as the rotation meter image 607 or the speed meter image 608. For example, in FIGS. 19A to 19C, a collective image of the rotation meter image 607 and the indicator/warning images 691, 692 may be provided as a first display image 620. In this case, a collective image of the intermediate image 607a and the indicator/warning images 691a, 692a may be provided as an intermediate image 620a and a collective image of the contraction image 607b and the indicator/warning images 691b, 692b may be provided as a contraction image 620b.

A collective image of the speed meter image 608 and the indicator/warning images 693, 694 may be provided as a first display image 630. In this case, a collective image of the intermediate image 608a and the indicator/warning images 693a, 694a may be provided as an intermediate image 630a and a collective image of the contraction image 608b and the indicator/warning images 693b, 694b may be provided as a contraction image 630b.

The liquid crystal panel 602 may be a monochrome liquid crystal panel not showing a full color display.

In place of the liquid crystal panel 602 as the light-receiving type display panel (i.e., a non-light-emitting type display panel), an EL display panel (an electro luminescence display panel) as the light-emitting type display panel may be used.

The present invention is not limited to the aforementioned examples, but may be applied to a combination thereof or other various modifications.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A display device comprising:
    a display panel in which a plurality of pixels are formed in a matrix shape; and
    a control means for switching a display of the display panel among a first display image indicating first information, a contraction image indicating the first information in a size contracted from the first display image and in a form different from the first display image, and an intermediate image indicating the first information in the same size as the first display image and in a form that is the same as or similar to the contraction image, wherein
    when the display is switched between the first display image and the contraction image, the display is switched to the intermediate image in the course of the switching of the display.

2. The display device as in claim 1, wherein
    the display is switched from the intermediate image to the contraction image by gradually contracting the intermediate image to the size of the contraction image.

3. The display device as in claim 1, wherein
    the display is switched from the contraction image to the intermediate image by gradually enlarging the contraction image to the size of the intermediate image.

4. The display device as in claim 1, wherein
    when the display is switched to the contraction image, a second display image indicating second information is displayed by using a region obtained by subtracting a region where the contraction image is displayed from a region where the first display image was displayed.

* * * * *